United States Patent
Fukushi et al.

(10) Patent No.: US 10,148,658 B2
(45) Date of Patent: Dec. 4, 2018

(54) INFORMATION PROCESSING APPARATUS AND METHOD, AND PROGRAM

(71) Applicant: SONY CORPORATION, Tokyo (JP)

(72) Inventors: Gakuho Fukushi, Tokyo (JP);
Shinsuke Araya, Kanagawa (JP);
Yoichi Kobori, Kanagawa (JP);
Yoshinori Takagi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 110 days.

(21) Appl. No.: 14/917,141

(22) PCT Filed: Nov. 6, 2014

(86) PCT No.: PCT/JP2014/005587
§ 371 (c)(1),
(2) Date: Mar. 7, 2016

(87) PCT Pub. No.: WO2015/072114
PCT Pub. Date: May 21, 2015

(65) Prior Publication Data
US 2016/0197925 A1    Jul. 7, 2016

(30) Foreign Application Priority Data
Nov. 14, 2013   (JP) .................. 2013-235995

(51) Int. Cl.
*H04L 29/06* (2006.01)
*G06F 21/34* (2013.01)
*G06F 21/62* (2013.01)

(52) U.S. Cl.
CPC .............. *H04L 63/10* (2013.01); *G06F 21/34* (2013.01); *G06F 21/6218* (2013.01);
(Continued)

(58) Field of Classification Search
CPC ..... H04L 63/10; H04L 63/0492; H04L 63/08; H04L 63/083; G06F 21/34;
(Continued)

(56) References Cited

U.S. PATENT DOCUMENTS

2002/0035516 A1*  3/2002  Arima ................... G06Q 30/06
                                                        705/26.8
2002/0107806 A1*  8/2002  Higashi .................. G06F 21/10
                                                        705/51
(Continued)

FOREIGN PATENT DOCUMENTS

CA          2 845 716 A1    4/2013
JP       2002-288343 A     10/2002
(Continued)

OTHER PUBLICATIONS

Feng, Xue, Zhi Tang, and YinYan Yu. "An efficient contents sharing method for DRM." Consumer Communications and Networking Conference, 2009. CCNC 2009. 6th IEEE. IEEE, 2009.*
(Continued)

*Primary Examiner* — Syed A Zaidi
(74) *Attorney, Agent, or Firm* — Oblon, McClelland, Maier & Neustadt, L.L.P.

(57) ABSTRACT

A system includes circuitry that receives a request for, and generates, individual terminal identification information. The individual terminal identification information identifies a terminal device with respect to other terminal devices and is used when accessing data associated with the individual identification information. Individual terminal identification information is recorded with the individual identification information.

16 Claims, 18 Drawing Sheets

| INDIVIDUAL IDENTIFICATION ID | SUSPENDED CODE | | MEDICATION HISTORY DATA |
|---|---|---|---|
| | INDIVIDUAL SET TERMINAL CODE | INDIVIDUAL TERMINAL ID | |
| ab01 | 1234 | 1 | MEDICATION HISTORY DATA A |
| ab02 | 1111 | 1 | MEDICATION HISTORY DATA B |
| | 2222 | 2 | |
| ab03 | 3998 | 1 | MEDICATION HISTORY DATA C |
| ⋮ | ⋮ | ⋮ | ⋮ |

(52) U.S. Cl.
CPC ...... *G06F 21/6245* (2013.01); *G06F 21/6272* (2013.01); *G06F 2221/2117* (2013.01); *G06F 2221/2141* (2013.01); *G06F 2221/2143* (2013.01); *G06F 2221/2151* (2013.01); *H04L 63/0492* (2013.01)

(58) Field of Classification Search
CPC ............ G06F 21/6218; G06F 21/6272; G06F 21/6245; G06F 2221/2117; G06F 2221/2141; G06F 2221/2143; G06F 2221/2151
USPC ............................................................ 726/6
See application file for complete search history.

(56) References Cited

U.S. PATENT DOCUMENTS

| | | | | |
|---|---|---|---|---|
| 2002/0174360 A1* | 11/2002 | Ikeda | ................... | G01C 21/26 726/7 |
| 2003/0061165 A1* | 3/2003 | Okamoto | ................ | G06F 21/10 705/52 |
| 2003/0065653 A1* | 4/2003 | Overton | ................... | H04L 29/06 |
| 2004/0024860 A1* | 2/2004 | Sato | ........................ | G06F 21/10 709/223 |
| 2004/0203363 A1* | 10/2004 | Carlton | .................. | G06Q 30/02 455/41.2 |
| 2004/0249961 A1* | 12/2004 | Katsube | .................. | H04L 63/08 709/229 |
| 2005/0113082 A1* | 5/2005 | Bender | ................... | H04W 8/26 455/422.1 |
| 2005/0117719 A1* | 6/2005 | Hyotani | ................ | G06Q 10/10 379/90.01 |
| 2007/0136202 A1* | 6/2007 | Noma | ..................... | G06Q 99/00 705/51 |
| 2008/0082557 A1* | 4/2008 | Ohara | .................... | G06Q 10/00 |
| 2008/0101586 A1* | 5/2008 | Fukazawa | ........... | H04M 7/0027 379/229 |
| 2009/0140045 A1* | 6/2009 | Evans | .................... | G06F 21/335 235/382 |
| 2009/0260064 A1* | 10/2009 | McDowell | .............. | G06F 21/10 726/4 |
| 2010/0180022 A1* | 7/2010 | Fujita | .................. | G06F 9/44505 709/223 |
| 2011/0145897 A1* | 6/2011 | Tyree | ...................... | G06F 21/42 726/6 |
| 2011/0264768 A1* | 10/2011 | Walker | ................... | H04N 21/00 709/218 |
| 2012/0028609 A1* | 2/2012 | Hruska | .............. | G06Q 20/3674 455/411 |
| 2012/0030743 A1* | 2/2012 | Semba | .................... | G06F 21/32 726/7 |
| 2012/0079095 A1* | 3/2012 | Evans | ....................... | G06F 8/61 709/224 |
| 2013/0174276 A1* | 7/2013 | Nomura | ................. | G06F 21/00 726/28 |
| 2014/0222468 A1 | 8/2014 | Araya et al. | | |

FOREIGN PATENT DOCUMENTS

| | | |
|---|---|---|
| JP | 2006-53825 A | 2/2006 |
| JP | 2007-164449 A | 6/2007 |
| JP | 2013-3712 A | 1/2013 |
| JP | 2013-101585 A5 | 5/2013 |
| JP | 2015-95229 A | 5/2015 |
| JP | 6150129 B2 | 6/2017 |
| WO | WO 2013/054749 A1 | 4/2013 |

OTHER PUBLICATIONS

Extended European Search Report dated Oct. 13, 2017 in Patent Application No. 17179595.8.
International Search Report dated Feb. 2, 2015 in PCT/JP2014/005587.

* cited by examiner

FIG. 3

| INDIVIDUAL IDENTIFICATION ID | SUSPENDED CODE | | MEDICATION HISTORY DATA |
|---|---|---|---|
| | INDIVIDUAL SET TERMINAL CODE | INDIVIDUAL TERMINAL ID | |
| ab01 | 1234 | 1 | MEDICATION HISTORY DATA A |
| ab02 | 1111 | 1 | MEDICATION HISTORY DATA B |
| | 2222 | 2 | |
| ab03 | 3998 | 1 | MEDICATION HISTORY DATA C |
| ... | ... | ... | ... |

FIG. 11

| INDIVIDUAL IDENTIFICATION ID | SUSPENDED CODE | | MEDICATION HISTORY DATA | REGISTRATION DEADLINE |
|---|---|---|---|---|
| | INDIVIDUAL SET TERMINAL CODE | INDIVIDUAL TERMINAL ID | | |
| ab01 | 1234 | 1 | MEDICATION HISTORY DATA A | REGISTRATION COMPLETION |
| ab02 | 1111 | 1 | MEDICATION HISTORY DATA A | REGISTRATION COMPLETION |
| | — | 2 | MEDICATION HISTORY DATA B | 3/2/2005 |
| ab03 | — | 1 | MEDICATION HISTORY DATA C | 4/4/2005 |
| ... | ... | ... | ... | ... |

FIG. 13

| INDIVIDUAL IDENTIFICATION ID | SUSPENDED CODE | | MEDICATION HISTORY DATA | EXPIRATION DATE |
|---|---|---|---|---|
| | INDIVIDUAL SET TERMINAL CODE | INDIVIDUAL TERMINAL ID | | |
| ab01 | 1234 | 1 | MEDICATION HISTORY DATA A | 2/12/2005 |
| ab02 | 1111 | 1 | | 3/15/2005 |
| | 2222 | 2 | MEDICATION HISTORY DATA B | 3/30/2005 |
| ab03 | 3998 | 1 | MEDICATION HISTORY DATA C | 4/4/2005 |
| ... | ... | ... | ... | ... |

FIG. 15

| INDIVIDUAL IDENTIFICATION ID | SUSPENDED CODE | | YEAR OF BIRTH | GENDER | MEDICATION HISTORY DATA |
|---|---|---|---|---|---|
| | INDIVIDUAL SET TERMINAL CODE | INDIVIDUAL TERMINAL ID | | | |
| ab01 | 1234 | 1 | 1950 | FEMALE | MEDICATION HISTORY DATA A |
| ab02 | 1111 | 1 | 1980 | MALE | MEDICATION HISTORY DATA B |
| | 2222 | 2 | 1922 | FEMALE | |
| ab03 | 3998 | 1 | 1960 | MALE | MEDICATION HISTORY DATA C |
| ... | ... | ... | ... | ... | ... |

INFORMATION PROCESSING APPARATUS AND METHOD, AND PROGRAM

TECHNICAL FIELD

The present disclosure relates to an information processing apparatus and an information processing method, and a program, particularly, to an information processing apparatus and an information processing method, and a program by which security is able to be improved, and convenience is also able to be improved.

CROSS REFERENCE TO RELATED APPLICATIONS

This application claims the benefit of Japanese Priority Patent Application JP 2013-235995 filed Nov. 14, 2013, the entire contents of which are incorporated herein by reference.

BACKGROUND ART

For example, a service or the like in which various data items are managed by a server, and an individual user is able to browse the data, is known. It is considered that the data which is a browsing target, for example, is various data items such as medication history data of the user, and when the data of the browsing target is individual data items, it is necessary to perform an identity verification by suitably using individual information or the like of the user.

In the related art, the individual information is strictly protected and handled after being acquired, and thus the management cost of relational data is considerably increased.

Therefore, a mechanism in which the individual information is not recorded in a server side, and a mechanism in which the individual information is directly transmitted to a portable terminal device side by a Quick Response (QR) code (registered trade mark) are proposed (for example, refer to PTL 1).

In addition, a technology in which a terminal ID, a phone number, and the like which are assigned for each portable terminal device in advance are registered in a server side when a browsing permission is granted with respect to the portable terminal device, is also proposed (for example, refer to PTL 2). According to this technology, uniqueness of the portable terminal device in the server is guaranteed, and the user is able to designate the portable terminal device from which the user desires to revoke the permission for the service.

CITATION LIST

Patent Literature

PTL 1: Japanese Unexamined Patent Application Publication No. 2013-101585
PTL 2: Japanese Unexamined Patent Application Publication No. 2007-164449

SUMMARY OF INVENTION

Technical Problem

However, in the technology described above, it is difficult to improve security, and to improve convenience.

For example, in the technology described in PTL 1, since the individual information is not recorded in the server side, it is possible to improve security. However, in this technology, when the user records the individual information in a plurality of portable terminal devices, and browses the data managed by the server, it is difficult to discriminate each portable terminal device in the server side. For this reason, for example, it is difficult to subsequently prohibit only a specific portable terminal device from accessing, and thus is inconvenient.

In addition, in the technology described in PTL 2, the user is able to designate the portable terminal device from which the user desires to revoke the permission for the service, but it is necessary to record a terminal ID, a phone number of a mobile phone, or the like in the server side. Such a terminal ID or a phone number which is intrinsic to the portable terminal device is regarded as being extremely close to the individual information, and thus it is inconvenient when the mechanism in which the individual information is not included in the server side is realized.

It is desirable to provide an information processing apparatus and an information processing method, and a program by which security is able to be improved, and convenience is also able to be improved.

Solution to Problem

An information processing apparatus according to a first embodiment of the present disclosure includes: a reception unit which receives individual identification information for identifying a user; a creation unit which creates terminal identification information for identifying a terminal device used at the time of accessing data associated with the individual identification information; a recording unit which records the terminal identification information for one or each of a plurality of terminal devices in association with the individual identification information; and a transmission unit which transmits the terminal identification information.

When the reception unit receives the individual identification information and the terminal identification information, and a transmission request of the data from the terminal device, the transmission unit may transmit the data associated with the received individual identification information to the terminal device to be identified by the received terminal identification information.

The information processing apparatus may further include a registration management unit which invalidates access with respect to the data associated with the received individual identification information according to the terminal device to be identified by the received terminal identification information when the reception unit receives the individual identification information and the terminal identification information, and an invalidation request of the access with respect to the data.

The recording unit may further record auxiliary information related to a registration of the terminal device to be identified by the terminal identification information in association with the individual identification information and the terminal identification information, the transmission unit may transmit a list of the terminal identification information and the auxiliary information which are associated with the individual identification information, and the registration management unit may invalidate the access of the terminal device to be specified by the terminal identification information and the auxiliary information which are selected from the list.

The reception unit may receive the auxiliary information which is input by the terminal device and transmitted from the terminal device, and the recording unit may record the auxiliary information which is received by the reception unit in association with the individual identification information and the terminal identification information.

The auxiliary information may be a character string which is input by the terminal device.

At least any one of a year of birth, a gender, and a relationship with respect to the user of an owner of the terminal device may be included in the auxiliary information.

The recording unit may further record an expiration date of the terminal identification information or a deadline for validation of the terminal identification information.

An information processing method or a program according to a first embodiment of the present disclosure, includes: receiving individual identification information for identifying a user; creating terminal identification information for identifying a terminal device used at the time of accessing data associated with the individual identification information; recording the terminal identification information for one or each of a plurality of terminal devices in association with the individual identification information; and transmitting the terminal identification information.

According to the first embodiment of the present disclosure, the individual identification information for identifying the user is received, the terminal identification information for identifying the terminal device used at the time of accessing the data associated with the individual identification information is created, the terminal identification information for one or each of a plurality of terminal devices is recorded in association with the individual identification information, and the terminal identification information is transmitted.

An information processing apparatus according to a second embodiment of the present disclosure, which accesses data associated with individual identification information for identifying a user, includes: a near field communication unit which acquires the individual identification information, and terminal identification information for identifying the information processing apparatus from a target of near field communication by performing the near field communication; a recording unit which records the individual identification information and the terminal identification information; a transmission unit which transmits the individual identification information, the terminal identification information, and an access request with respect to the data to a data provision device for recording the terminal identification information for one or each of a plurality of information processing apparatuses in association with the individual identification information; and a reception unit which receives the data transmitted according to the access request.

The transmission unit may further transmit the individual identification information and the terminal identification information, and an invalidation request of access with respect to the data according to the information processing apparatus.

An information processing method or a program according to a second embodiment of the present disclosure, which accesses data associated with individual identification information for identifying a user, includes: acquiring the individual identification information, and terminal identification information for identifying the information processing apparatus from a target of near field communication by performing the near field communication; recording the individual identification information and the terminal identification information; transmitting the individual identification information, the terminal identification information, and an access request with respect to the data to a data provision device for recording the terminal identification information for one or each of a plurality of information processing apparatuses in association with the individual identification information; and receiving the data transmitted according to the access request.

According to the second embodiment of the present disclosure, in the information processing apparatus which accesses the data associated with the individual identification information for identifying the user, the individual identification information and the terminal identification information for identifying the information processing apparatus are acquired from the target of the near field communication by performing the near field communication, the individual identification information and the terminal identification information are recorded, the individual identification information, the terminal identification information, and the access request with respect to the data are transmitted to the data provision device for recording the terminal identification information for one or each of a plurality of information processing apparatuses in association with the individual identification information, and the data transmitted according to the access request is received.

An information processing apparatus according to a third embodiment of the present disclosure, includes: an acquirement unit which acquires individual identification information for identifying a user; a transmission unit which transmits the acquired individual identification information to a data provision device which manages data associated with the individual identification information, creates terminal identification information for identifying a terminal device used at the time of accessing the data, and records the terminal identification information for one or each of a plurality of terminal devices in association with the individual identification information; and a reception unit which receives the terminal identification information transmitted from the data provision device according to transmission of the individual identification information.

The transmission unit may further transmit the individual identification information and the terminal identification information, and an invalidation request of access with respect to the data associated with the individual identification information according to the terminal device to be identified by the terminal identification information.

The data provision device may record auxiliary information related to a registration of the terminal device to be identified by the terminal identification information in association with the individual identification information and the terminal identification information, the reception unit may receive a list of the terminal identification information and the auxiliary information which are associated with the individual identification information from the data provision device, and the transmission unit may transmit the invalidation request of the access of the terminal device to be specified by the terminal identification information and the auxiliary information which are selected from the list.

The auxiliary information may be at least any one of a character string which is input by the terminal device, a year of birth of an owner of the terminal device, a gender of the owner, and a relationship with respect to the user of the owner.

An information processing method or a program according to a third embodiment of the present disclosure, includes: acquiring individual identification information for identifying a user; transmitting the acquired individual identification information to a data provision device which manages data associated with the individual identification information, creates terminal identification information for identifying a terminal device used at the time of accessing the data, and records the terminal identification information for one or each of a plurality of terminal devices in association with the individual identification information; and receiving the terminal identification information transmitted from the data provision device according to transmission of the individual identification information.

According to the third embodiment of the present disclosure, the individual identification information for identifying the user is acquired, the acquired individual identification information is transmitted to the data provision device which manages the data associated with the individual identification information, creates the terminal identification information for identifying the terminal device used at the time of accessing the data, and records the terminal identification information for one or each of a plurality of terminal devices in association with the individual identification information, and the terminal identification information transmitted from the data provision device according to the transmission of the individual identification information is received.

Furthermore, according to one aspect of the disclosure, an information processing system is described that includes circuitry configured to receive a request for individual terminal identification information, the request including individual identification information, generate the individual terminal identification information, the individual terminal identification information identifies a terminal device with respect to other terminal devices and is used when accessing data associated with the individual identification information, and record in a storage device the individual terminal identification information in association with the individual identification information.

According to another aspect, an information processing system is described that includes circuitry configured to acquire individual identification information and individual information associated with an individual, transmit a request to a remote device for an individual terminal identification information, the request including the individual identification information, the individual terminal identification information identifies a terminal device with respect to other terminal devices, and receive the individual terminal identification information.

According to another aspect, a terminal device is described that includes circuitry configured to receive from a remote store terminal a code that includes individual terminal identification information, individual information, and individual identification information, decode the code, and record the individual terminal identification information, individual information, and individual identification information, wherein the remote store terminal received the individual terminal identification information from a remote device by providing the remote device with the individual identification information.

According to another aspect, an information processing method is described that includes receiving via an interface a request for individual terminal identification information, the request including individual identification information; generating with circuitry the individual terminal identification information, the individual terminal identification information identifies a terminal device with respect to other terminal devices and is used when accessing data associated with the individual identification information; and recording in a storage device the individual terminal identification information in association with the individual identification information.

According to another aspect, an information processing method is described that includes acquiring individual identification information and individual information associated with an individual, transmitting with circuitry a request to a remote device for an individual terminal identification information, the request including the individual identification information, the individual terminal identification information identifies a terminal device with respect to other terminal devices, and receiving with the circuitry the individual terminal identification information.

Furthermore, the effect described above is not limited, and may be any effect described in the present disclosure.

BRIEF DESCRIPTION OF DRAWINGS

FIG. 3 is a diagram illustrating an example of a database.

FIG. 11 is a diagram illustrating an example of a database.

FIG. 13 is a diagram illustrating an example of a database.

FIG. 15 is a diagram illustrating an example of a database.

DESCRIPTION OF EMBODIMENTS

Hereinafter, embodiments to which the present disclosure is applied will be described with reference to the drawings.

First Embodiment

<Configuration Example of Information Processing System>

Figure 1:
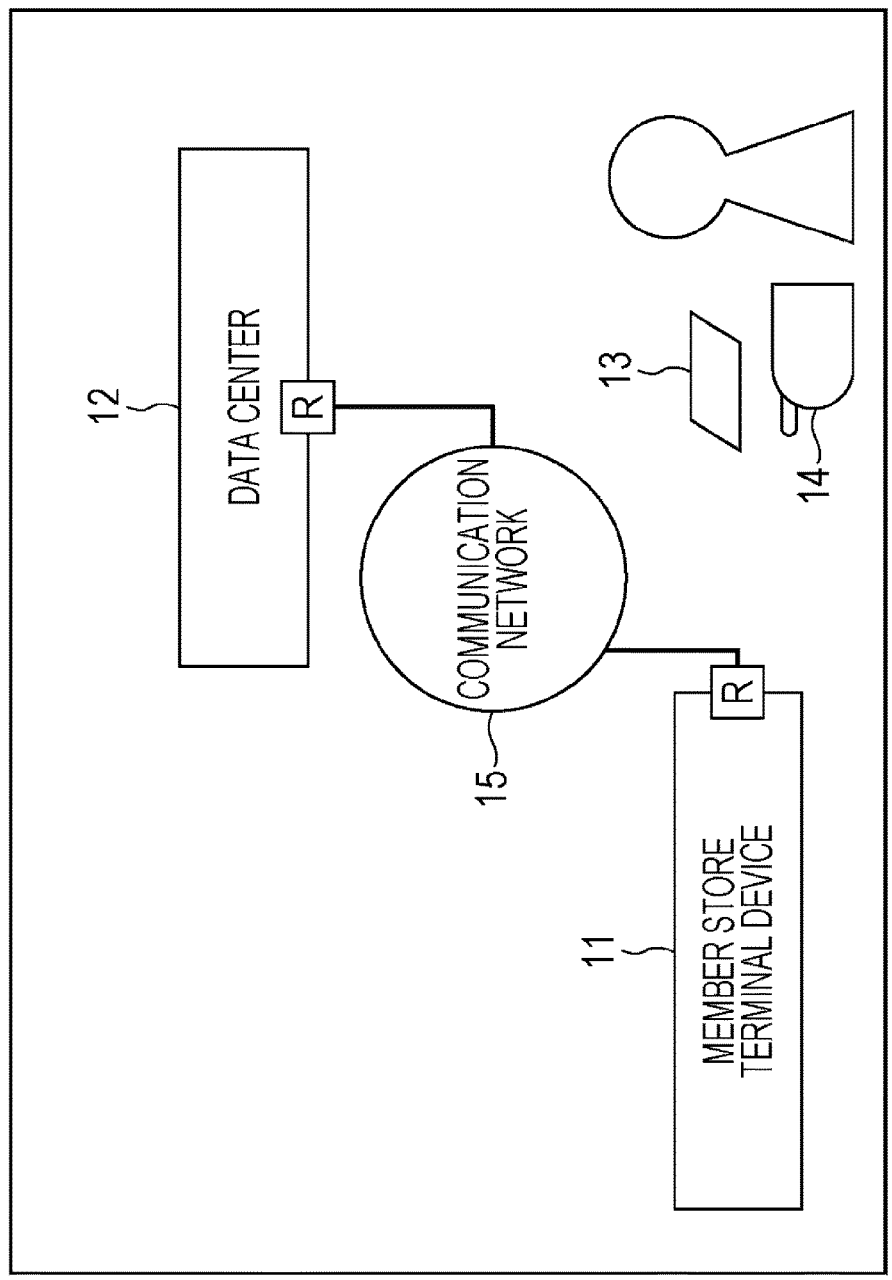
FIG. 1 is a diagram illustrating a configuration example of an information processing system.

FIG. 1 is a diagram illustrating a configuration example of an embodiment of an information processing system to which the present disclosure is applied.

The information processing system includes a member store terminal device 11, a data center 12, and an Integrated Circuit (IC) card 13 and a portable terminal device 14 which are carried by a user. In addition, the member store terminal device 11 and the data center 12 are connected to each other through a communication network 15 including a wired or wireless network such as the Internet.

The information processing system is able to be applied to a case in which various services are provided to the user, but in order to describe specifically, hereinafter, a case in which the user uploads medication history data such as an digitized medication notebook to the data center 12, and suitably browses the medication history data will be described as an example. Furthermore, the upload of the medication history data is performed by a service member store which is used by the user or by the user after performing an authentication or a face-to-face authentication using the IC card 13 as necessary.

The member store terminal device 11 is provided in the service member store for providing a predetermined service. In this example, the member store terminal device 11 is disposed, for example, in a pharmacy in which the user purchases a prescribed medication, or in a medical center which the user visits.

The member store terminal device 11 includes a computer or the like, and performs various processes according to an input manipulation of a pharmacist or the like. Specifically, for example, the member store terminal device 11 creates medication history data of the user according to the input manipulation of the pharmacist or the like, and records the medication history data, or records the medication history data by transmitting the data to the data center 12 through the communication network 15.

In addition, the member store terminal device 11 may be used in an identity authentication or the like by reading out an individual identification ID which is an ID intrinsic to the user, or individual information from the IC card 13 of the user, or may transmit information or the like which is necessary for accessing the medication history data managed in the data center 12 to the portable terminal device 14 by near field communication.

Here, the individual identification ID is one of individual identification information items which are able to uniquely specify the user, and is information which is not generally able to (for which it is difficult to) specify an individual user to allow identification by the individual identification ID simply through the individual identification ID being obtained by a stranger.

Furthermore, a medium which serves as an opportunity for acquiring the individual identification ID is not limited to the IC card or the like in which the individual identification ID is directly recorded, and the medium may be an intrinsic medium which is not rewritable or in which substitution is not possible. For example, when intrinsic information is acquired from biological information as the individual identification ID, the medium for acquiring the individual identification ID is a part or all of a human body.

The data center 12 manages the medication history data supplied from the member store terminal device 11 or the portable terminal device 14, and allows the recorded medication history data to be browsed according to a request from the member store terminal device 11 or the portable terminal device 14.

Furthermore, here, as an example of management data which is managed by the data center 12, the medication history data will be described, but the management data may be any data insofar as the data is accessed by the user.

The IC card 13 is an IC card which is suitably used when the user who receives a service provided by the service member store in which the member store terminal device 11 is disposed, receives the service. The IC card 13 is issued to each user. In the IC card 13, individual information such as an individual identification ID for authenticating the user who is a service user, and a name, a date of birth, and a gender of the user is recorded. Furthermore, the individual information recorded in the IC card 13 may further include an address or a phone number of the user, an insurance card number, or the like.

The IC card 13 communicates with the member store terminal device 11, and transmits the recorded individual identification ID or individual information to the member store terminal device 11.

The portable terminal device 14 includes a portable telephone or the like which is carried by the user, communicates with the member store terminal device 11 or the data center 12 through a communication network (not illustrated) or the communication network 15, and accepts information as necessary. For example, the portable terminal device 14 receives the medication history data from the data center 12 and displays the data, or transmits the medication history data to the data center 12 and updates the data.

Furthermore, in an example of FIG. 1, only one member store terminal device 11 is illustrated in the information processing system, but in fact, a plurality of member store terminal devices 11 is included in the information processing system.

<Configuration Example of Data Center>

Next, a configuration of the member store terminal device 11, the data center 12, and the portable terminal device 14 illustrated in FIG. 1 will be described.

Figure 2:
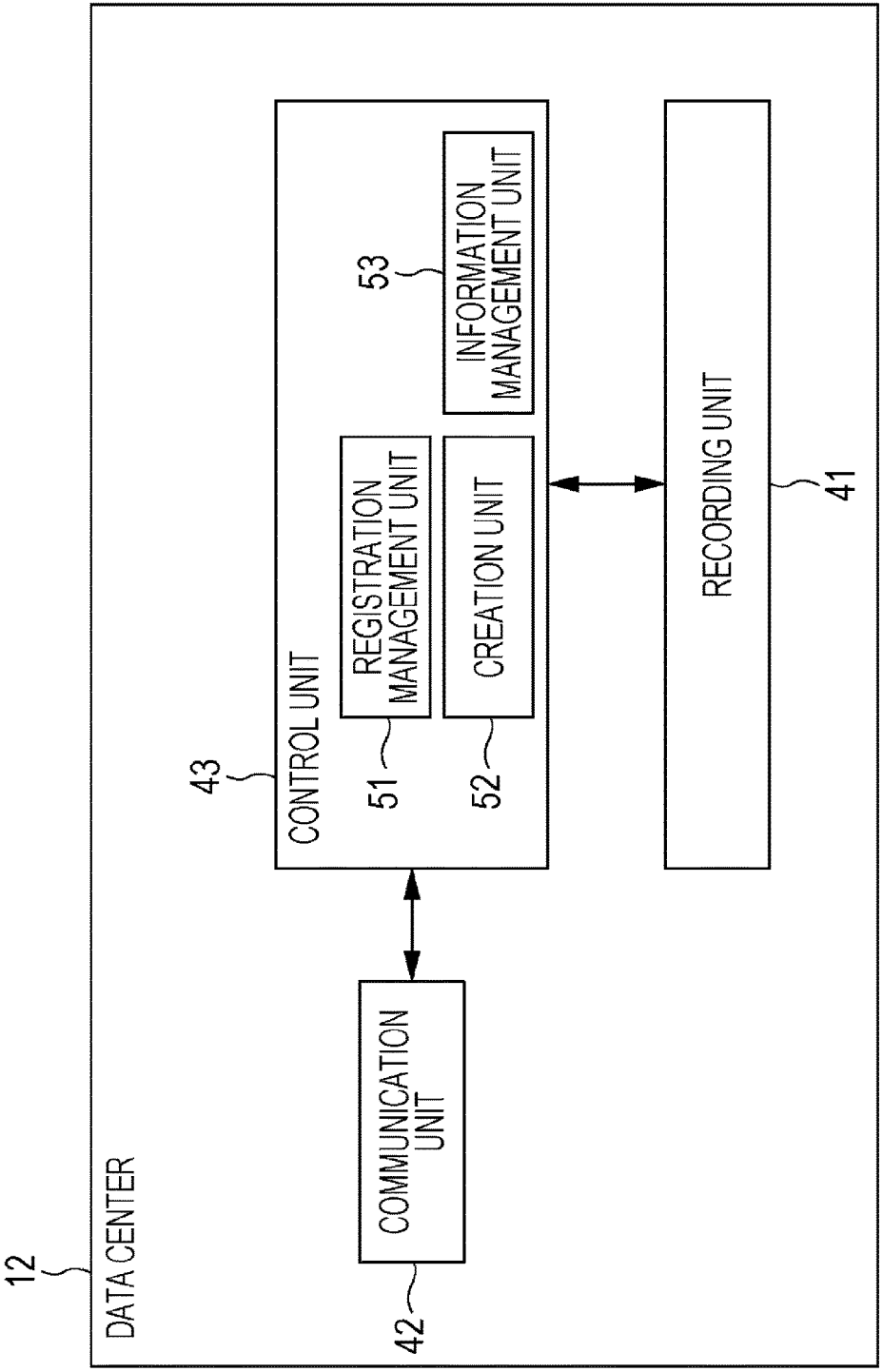
FIG. 2 is a diagram illustrating a configuration example of a data center.

FIG. 2 is a diagram illustrating a configuration example of the data center 12. Furthermore, in FIG. 2, the data center 12 is configured as one device, but the data center 12 may be configured by a plurality of devices.

The data center 12 illustrated in FIG. 2 includes a recording unit 41, a communication unit 42, and a control unit 43.

The recording unit 41 is, for example, a database, and records various data items such as medication history data of each user, an individual identification ID, an individual set terminal code, and an individual terminal ID, and supplies the recorded data to the control unit 43 as necessary.

Here, the individual terminal ID is terminal identification information which is able to uniquely specify the portable terminal device 14 registered with respect to the individual identification ID in the data center 12. That is, the individual terminal ID is information for uniquely identifying which portable terminal device 14 among one or a plurality of portable terminal devices 14 registered with respect to the individual identification ID is a predetermined portable terminal device 14.

Therefore, by using the individual identification ID and the individual terminal ID, it is possible to uniquely identify which portable terminal device 14 is registered with respect to which IC card 13 in the data center 12. For this reason, in the data center 12, a combination of the individual identification ID and the individual terminal ID is used as information (an access key) or the like for managing the access when the user accesses the medication history data.

In addition, the individual set terminal code is information for specifying the portable terminal device 14, which is determined by the user, and the user designates information which is easy for the user to remember, for example, as the individual set terminal code. Therefore, when the user confirms the individual set terminal code, it is possible to easily understand which portable terminal device 14 is indicated by the individual set terminal code.

The individual set terminal code is used when an access authority with respect to the medication history data is invalidated, that is, when the use of the service is suspended.

The communication unit 42 communicates with the member store terminal device 11 or the portable terminal device 14 through the communication network 15 or the like, and supplies the received information to the control unit 43, or transmits the information supplied from the control unit 43.

The control unit 43 controls an operation of the entire data center 12. The control unit 43 includes a registration management unit 51, a creation unit 52, and an information management unit 53.

The registration management unit 51 performs a process or the like related to the registration of the portable terminal device 14 for enabling the medication history data to be browsed. The creation unit 52 creates an individual terminal ID recorded in the recording unit 41. The information management unit 53 manages the data recorded in the recording unit 41.

Here, an example of the individual identification ID, the individual set terminal code, the individual terminal ID, and the medication history data which are recorded in the recording unit 41 will be described. For example, as illustrated in FIG. 3, the individual set terminal code, the individual terminal ID, and the medication history data are recorded in association with the individual identification ID in the database.

In FIG. 3, the individual identification ID is information for uniquely identifying the user, which is read out from the IC card 13, and the individual identification ID is associated with the individual set terminal code, the individual terminal ID, and the medication history data.

For example, an individual identification ID "ab01" is associated with an individual set terminal code "1234", an individual terminal ID "1", and medication history data "medication history data A". Here, the number of medication history data items associated with the individual identification ID is typically 1, but the number of individual set terminal codes and the number of individual terminal IDs are associated with the individual identification ID in accordance with the number of registered portable terminal devices 14.

For example, an individual identification ID "ab02" is associated with an individual set terminal code "1111" of the portable terminal device 14 specified by the individual terminal ID "1", and an individual set terminal code "2222" of the portable terminal device 14 specified by an individual terminal ID "2".

Therefore, in this case, the user is able to access the same medication history data B from two portable terminal devices 14. Thus, when it is possible to access the medication history data of the user from a number of portable terminal devices 14, user convenience is able to be improved.

In addition, in an example of FIG. 3, successive numbers are applied to each of the portable terminal devices 14 registered with respect to the same individual identification ID in order of registration as the individual terminal IDs. In this example, successive serial numbers are applied as the individual terminal IDs in sequence from "1". Further, in the data center 12, a combination of the individual terminal ID and the individual set terminal code which are associated with each other is a suspended code which is used when the user suspends the use of the service in the portable terminal device 14 specified by the individual terminal ID. For example, the suspended code is information which is obtained by adding the individual terminal ID to the end of the individual set terminal code.

<Configuration Example of Member Store Terminal Device>

Next, a configuration of the member store terminal device 11 will be described.

Figure 4:
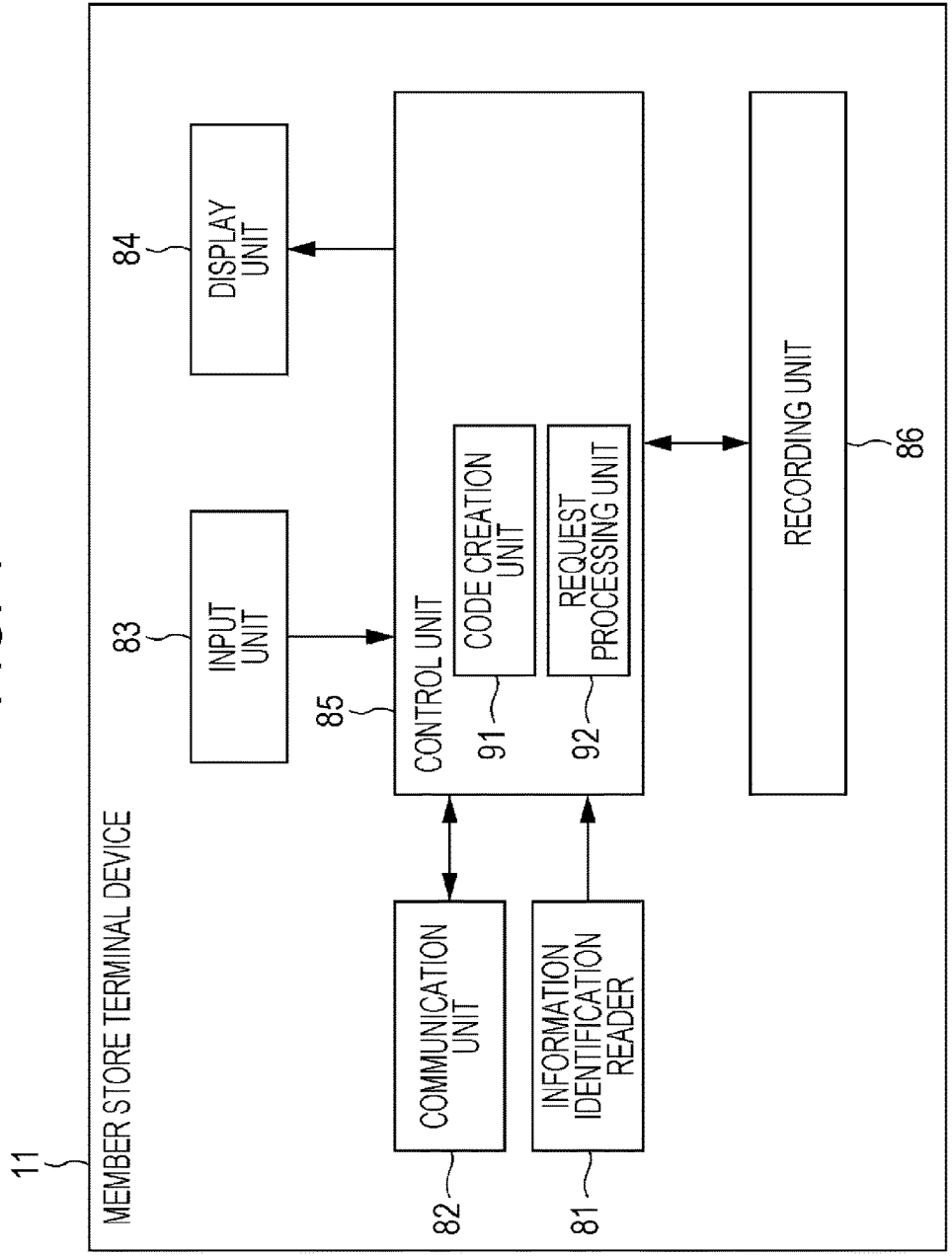
FIG. 4 is a diagram illustrating a configuration example of a member store terminal device.

FIG. 4 is a diagram illustrating a configuration example of the member store terminal device 11. Furthermore, in FIG. 4, the member store terminal device 11 is configured as one device, but the member store terminal device 11 may be configured by a plurality of devices.

The member store terminal device 11 includes an information identification reader 81, a communication unit 82, an input unit 83, a display unit 84, a control unit 85, and a recording unit 86.

The information identification reader 81 contactlessly communicates with the IC card 13, reads out the individual identification ID and the individual information from the IC card 13, and supplies the information to the control unit 85. The communication unit 82 communicates with each device such as the data center 12 through the communication network 15, and receives the transmitted information and supplies information to the control unit 85, or transmits the information supplied from the control unit 85.

The input unit 83 includes a mouse or the like, and supplies a signal according to a manipulation of a pharmacist or the like to the control unit 85. The display unit 84 includes a liquid crystal display panel or the like, and displays an image or the like on the basis of the data supplied from the control unit 85.

The control unit 85 controls an operation of the entire member store terminal device 11. The control unit 85 includes a code creation unit 91 and a request processing unit 92.

The code creation unit 91 creates a QR code on the basis of the individual information or the like read out from the IC card 13, and displays the code on the display unit 84. In addition, the request processing unit 92 executes a process for performing various requests such as a provisional registration request of the portable terminal device 14 with respect to the data center 12.

The recording unit 86 records various data items such as the individual identification ID or the medication history data of the user, and supplies the data to the control unit 85, as necessary.

<Configuration Example of Portable Terminal Device>

Figure 5:
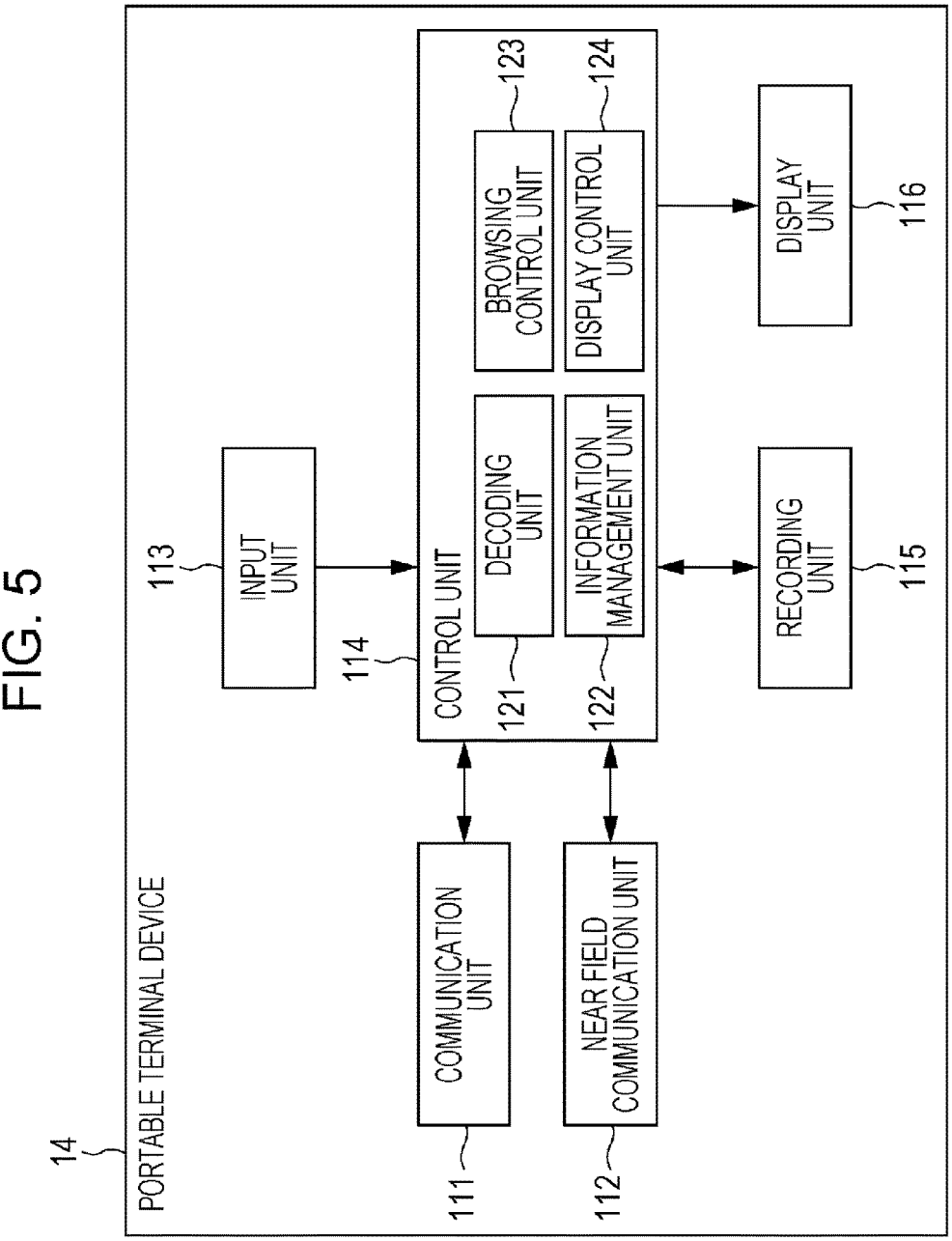
FIG. 5 is a diagram illustrating a configuration example of a portable terminal device.

Further, FIG. 5 is a diagram illustrating a configuration example of the portable terminal device 14.

The portable terminal device 14 includes a communication unit 111, a near field communication unit 112, an input unit 113, a control unit 114, a recording unit 115, and a display unit 116.

The communication unit 111 communicates with an external device such as the member store terminal device 11 or the data center 12, and receives various data items and supplies the data to the control unit 114, or transmits the data supplied from the control unit 114.

The near field communication unit 112 performs near field communication with the member store terminal device 11, and supplies the information received from the member store terminal device 11 to the control unit 114. For example, the near field communication unit 112 includes a camera or the like, shoots the QR code displayed on the member store terminal device 11 as the near field communication, and supplies the obtained image information to the control unit 114.

The input unit 113 includes, for example, an input button or a touch panel, a microphone, or the like, and supplies the information according to the input manipulation of the user to the control unit 114.

The control unit 114 controls an operation of the entire portable terminal device 14. The control unit 114 includes a decoding unit 121, an information management unit 122, a browsing control unit 123, and a display control unit 124.

The decoding unit 121 decodes the image information supplied from the near field communication unit 112, and extracts the information described in the QR code. The information management unit 122 manages the various data items recorded in the recording unit 115. That is, the information management unit 122 supplies the data to the recording unit 115 to be recorded, or reads out the data recorded in the recording unit 115.

The browsing control unit 123 performs a process related to browsing of the medication history data recorded in the data center 12. The display control unit 124 controls a display of an image or information of the display unit 116. The recording unit 115 records the various data items supplied from the control unit 114, and supplies the data to the control unit 114, as necessary. The display unit 116 includes a liquid crystal display panel or the like, and displays various images or information items on the basis of the data supplied from the control unit 114.

<For Provisional Registration>

Next, an operation of the information processing system illustrated in FIG. 1 will be described.

For example, in the information processing system, the user is able to browse the medication history data which is recorded in the data center 12, from the portable terminal device 14. In order to browse such medication history data, it is necessary for the user to register the information related to the portable terminal device 14 which is used at the time of browsing, in the data center 12 in advance.

In this embodiment, first, the user performs a provisional registration, records the individual identification ID and the individual terminal ID in the portable terminal device 14, and subsequently transmits the individual set terminal code to the data center 12, and completes a main registration, and thus is able to browse the medication history data. Hereinafter, a process of the information processing system which is performed at the time of the provisional registration and the main registration will be described.

Figure 6:
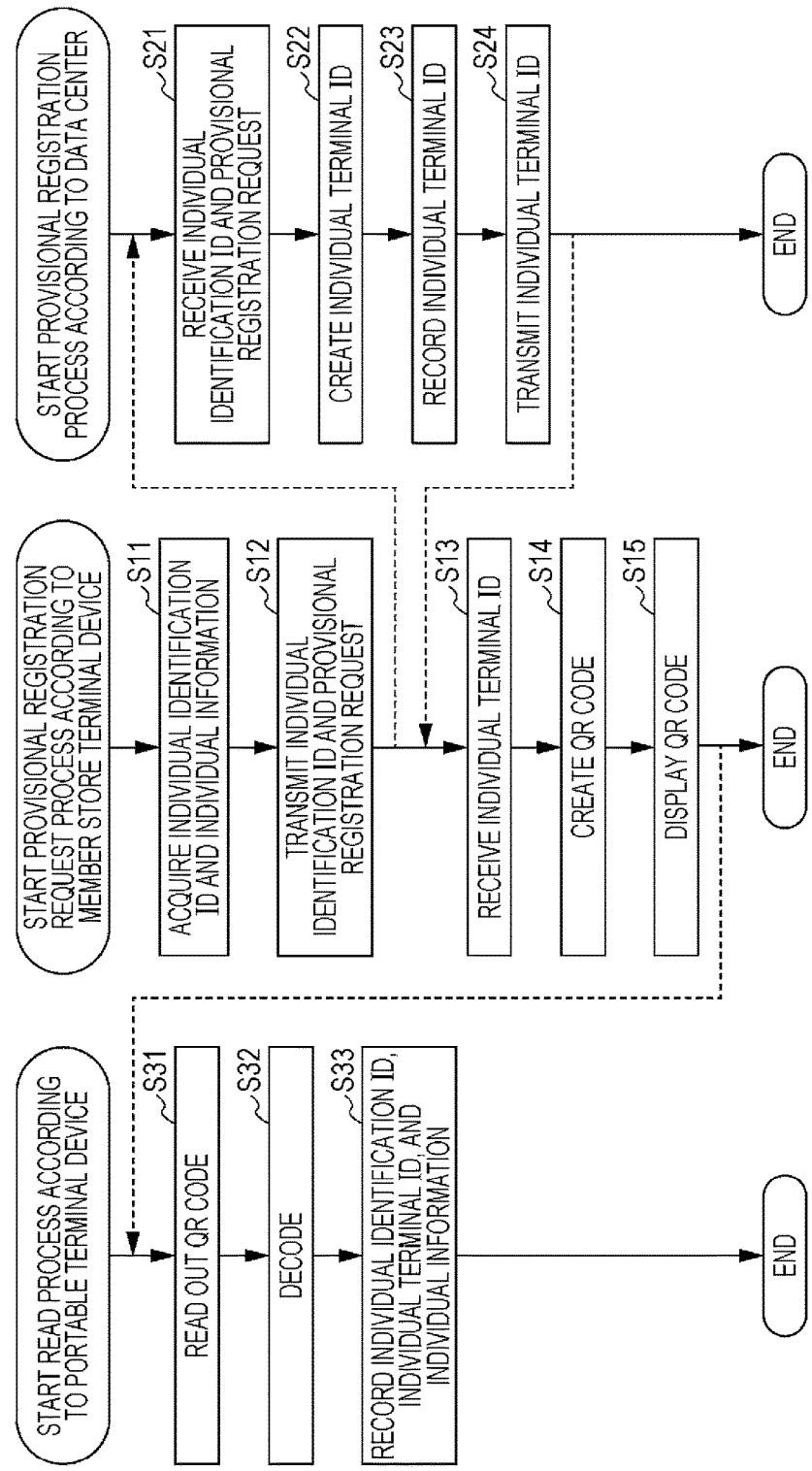
FIG. 6 is a flowchart for describing a read process, a provisional registration request process, and a provisional registration process.

First, a read process according to the portable terminal device 14, a provisional registration request process according to the member store terminal device 11, and a provisional registration process according to the data center 12 which are performed at the time of the provisional registration will be described with reference to a flowchart of FIG. 6.

When the provisional registration is performed, for example, the user visits the service member store in which the member store terminal device 11 is disposed, and notifies a pharmacist or the like who is a shop assistant in the service member store of the intention to perform a new registration. Then, the pharmacist or the like demands presentation of the IC card 13 carried by the user.

Then, when the user holds the IC card 13 toward the information identification reader 81 of the member store terminal device 11, in Step S11, the information identification reader 81 of the member store terminal device 11 contactlessly communicates with the IC card 13, and acquires the individual identification ID and the individual information from the IC card 13 to be supplied to the control unit 85. In addition, the control unit 85 supplies the individual identification ID and the individual information which are supplied from the information identification reader 81 to the display unit 84 to be displayed, as necessary. The pharmacist or the like uses the displayed individual information or the like, and performs an identity verification for a suitable user.

In Step S12, the communication unit 82 transmits the individual identification ID and a provisional registration request to the data center 12 through the communication network 15. That is, the request processing unit 92 creates the provisional registration request for requesting the provisional registration of a new portable terminal device 14 of the user which is identified by the individual identification ID, and supplies the provisional registration request, and the individual identification ID supplied from the information identification reader 81 to the communication unit 82. Then, the communication unit 82 transmits the individual identification ID and the provisional registration request which are supplied from the request processing unit 92 to the data center 12.

In Step S21, the communication unit 42 of the data center 12 receives the individual identification ID and the provisional registration request which are transmitted from the member store terminal device 11 to be supplied to the control unit 43.

In Step S22, the creation unit 52 creates an individual terminal ID with respect to the received individual identification ID. That is, the registration management unit 51 instructs the creation unit 52 to create the individual terminal ID according to the received provisional registration request, and the creation unit 52 issues the individual terminal ID according to the instruction. Furthermore, the individual terminal ID is different from the other individual terminal IDs which are recorded in the recording unit 41 in association with the individual identification ID to be registered, and may be any identification information insofar as the individual terminal ID is unique to each of the individual identification IDs.

In Step S23, the information management unit 53 supplies the individual terminal ID to the recording unit 41 according to the instruction of the registration management unit 51 to be recorded. That is, the information management unit 53 records the individual terminal ID in association with the individual identification ID received in Step S21 among the individual identification IDs recorded in the recording unit 41.

For example, in the example illustrated in FIG. 3, when the individual identification ID "ab02" is received, and the individual terminal ID "2" is created, the individual terminal ID "2" is newly associated with the individual identification ID "ab02" and recorded. Therefore, when there is the individual identification ID and the individual terminal ID, it is possible to uniquely specify the combination of the IC card 13 and the portable terminal device 14. Furthermore, when the individual identification ID corresponding to the recording unit 41 is not recorded, a new individual identification ID is recorded, and an individual terminal ID is recorded in association with the individual identification ID.

Thus, when the individual terminal ID is recorded in association with the individual identification ID, the provisional registration of the portable terminal device 14 is completed. When the provisional registration is performed, the registration management unit 51 supplies the created individual terminal ID to the communication unit 42, and instructs the transmission.

In Step S24, the communication unit 42 transmits the individual terminal ID supplied from the registration management unit 51 to the member store terminal device 11 through the communication network 15, and the provisional registration process is ended.

In addition, in Step S13, the communication unit 82 of the member store terminal device 11 receives the individual terminal ID transmitted from the data center 12, and supplies the ID to the control unit 85.

In Step S14, the code creation unit 91 creates a QR code on the basis of the individual terminal ID received in Step S13, the individual identification ID and the individual information which are read out in Step S11, and supplies the code to the display unit 84. The QR code created by the code creation unit 91 includes the individual identification ID, the individual terminal ID, and the individual information as the information.

In Step S15, the display unit 84 displays the QR code supplied from the code creation unit 91, and the provisional registration request process is ended. That is, the code creation unit 91 displays the QR code on the display unit 84, and thus performs the near field communication with the portable terminal device 14 by the QR code, and transmits the information included in the QR code to the portable terminal device 14.

Thus, when the QR code is displayed on the display unit 84, the portable terminal device 14 carried by the user is allowed to perform the near field communication with the member store terminal device 11, and to read out the QR code.

That is, in Step S31, the near field communication unit 112 of the portable terminal device 14 reads out the QR code by shooting the QR code displayed on the display unit 84 with a camera function, and supplies the code to the control unit 114. That is, the image information of the QR code obtained by shooting the code is supplied to the control unit 114.

Furthermore, here, as the near field communication for exchanging the individual identification ID, the individual terminal ID, and the individual information between the member store terminal device 11 and the portable terminal device 14, communication using the QR code is illustratively described, but any method may be used insofar as the communication method does not go through the communication network 15 such as the Internet. For example, the member store terminal device 11 and the portable terminal device 14 may perform infrared communication, Near Field Communication (NFC), or the like as the near field communication, and may exchange the individual identification ID, the individual terminal ID, and the individual information.

In Step S32, the decoding unit 121 decodes the image information of the QR code supplied from the near field communication unit 112, and extracts the individual identification ID, the individual terminal ID, and the individual information which are described in the QR code.

In Step S33, the information management unit 122 supplies the individual identification ID, the individual terminal ID, and the individual information to the recording unit 115 to be recorded, and the read process is ended. Thus, when the individual identification ID and the individual terminal ID are recorded in the portable terminal device 14, the portable terminal device 14 is able to access the data center 12 by using the individual identification ID and the individual terminal ID. Furthermore, since the portable terminal device 14 is able to access the data center 12 insofar as at least the individual identification ID and the individual terminal ID are recorded, it is not necessary to record the individual information.

As described above, the data center 12 receives the individual identification ID from the member store terminal device 11, and creates an individual terminal ID which is able to uniquely identify the portable terminal device 14 with respect to the individual identification ID to be recorded.

The individual terminal ID created in the data center 12 is information which secures uniqueness. Thus, by creating the individual terminal ID in the data center 12, the data center 12 is able to provide a service which does not maintain quasi individual information such as a SIM card ID of the portable terminal device 14 or a phone number, as the information for identifying the portable terminal device 14. Accordingly, it is possible to improve security.

Furthermore, in the data center 12, the individual terminal ID for one or each of a plurality of portable terminal devices 14 is recorded in association with one individual identification ID. For this reason, in the data center 12 side, it is possible to individually identify each portable terminal device 14 which is used by the user or the like and identified by the individual identification ID. That is, it is possible to discriminate each of the portable terminal devices 14 for each user, and to provide the service. Accordingly, it is possible to improve user convenience.

In addition, the user is able to access the data center 12 from the plurality of portable terminal devices 14, and thus it is possible to improve convenience. For example, when the portable terminal device 14 of a marital partner or the like of the user is registered, not only the user but also the marital partner is able to access the medication history data from the portable terminal device 14 of the marital partner.

<For Main Registration>

As described above, when the provisional registration is performed, the user subsequently performs the main registration by accessing the data center 12. Hereinafter, a registration request process according to the portable terminal device 14, and a registration process according to the data center 12 which are performed at the time of the main registration will be described with reference to a flowchart of FIG. 7.

In Step S61, the browsing control unit 123 of the portable terminal device 14 receives an input of the individual set terminal code by the user.

For example, the browsing control unit 123 displays an input screen of the individual set terminal code on the display unit 116 at the time of first running an application program for browsing the medication history data, which is recorded in the recording unit 115, or at the time of first accessing a web page or the like of the data center 12.

On the input screen, a text message according to the input of the individual set terminal code is displayed, and the user inputs numbers, characters, symbols, or the like which are easy for the user to remember, or a character string which is a combination thereof as the individual set terminal code by manipulating the input unit 113. Then, the control unit 114 is supplied with the information according to the manipulation of the user, that is, the input individual set terminal code from the input unit 113.

In addition, the information management unit 122 reads out the individual identification ID and the individual terminal ID from the recording unit 115 according to the instruction of the browsing control unit 123. The browsing control unit 123 supplies the read out individual identification ID and individual terminal ID, and the individual set terminal code supplied from the input unit 113 to the communication unit 111.

In Step S62, the communication unit 111 transmits the individual identification ID, the individual terminal ID, and the individual set terminal code which are supplied from the browsing control unit 123 to the data center 12 through the communication network such as the communication network 15.

Then, in Step S71, the communication unit 42 of the data center 12 receives the individual identification ID, the individual terminal ID, and the individual set terminal code which are transmitted from the portable terminal device 14 to be supplied to the control unit 43.

In Step S72, the registration management unit 51 controls the information management unit 53 on the basis of the individual identification ID, the individual terminal ID, and the individual set terminal code which are supplied from the communication unit 42, and records the individual set terminal code in the recording unit 41. That is, in the recording unit 41, the individual set terminal code is recorded in association with the individual identification ID and the individual terminal ID which are identical to the received individual identification ID and individual terminal ID among the recorded individual identification IDs and individual terminal IDs.

Accordingly, in the recording unit 41, the individual terminal ID and the individual set terminal code for each portable terminal device 14 are recorded in association with the individual identification ID. In addition, the medication history data of the user which is specified by the individual identification ID is recorded in association with the individual identification ID. Thus, when the individual set terminal code is recorded, the main registration of the portable terminal device 14 is completed.

When the main registration is completed, the registration management unit 51 supplies the information to the effect that the main registration is completed to the communication unit 42, and instructs the transmission of the information. The information to the effect that the main registration is completed, includes the suspended code, that is, the individual set terminal code and the individual terminal ID.

In Step S73, the communication unit 42 transmits the information to the effect that the main registration is completed which is supplied from the registration management unit 51 to the portable terminal device 14, and the registration process is ended.

In addition, in Step S63, the communication unit 111 of the portable terminal device 14 receives the information to the effect that the main registration is completed which is transmitted from the data center 12, and supplies the information to the control unit 114.

In Step S64, the display control unit 124 supplies the information such as the suspended code included in the information to the effect that the main registration is completed which is supplied from the communication unit 111 to the display unit 116 to be displayed, and the registration request process is ended.

In this case, on the display unit 116, for example, a message to the effect that the main registration is completed, a message for urging to keep the suspended code, or the like is displayed since the suspended code is displayed, and the suspended code is necessary at the time of suspending the use of the service in the registered portable terminal device 14.

For example, when the user of the registered portable terminal device 14 is a user such as a marital partner who is different from the owner of the IC card 13, the user of the registered portable terminal device 14 notifies the owner of the IC card 13 of the suspended code, and the owner of the IC card 13 is able to suspend the use of the service in the portable terminal device 14 by using the suspended code.

As described above, the portable terminal device 14 transmits the individual set terminal code input by the user, the individual identification ID, and the individual terminal ID to the data center 12, and the data center 12 records the individual set terminal code in association with the individual identification ID and the individual terminal ID.

Thus, the individual set terminal code for each portable terminal device 14 is recorded in the data center 12, and thus it is possible to safely and simply manage the access authority with respect to the medication history data by suitably using the individual set terminal code for each portable terminal device 14. Accordingly, it is possible to improve security and convenience.

In addition, in the information processing system, the same portable terminal device 14 may be registered with respect to a plurality of IC cards 13, and it is also possible to browse the medication history data of each of a plurality of users in one portable terminal device 14.

<For Browsing of Medication History Data>

When the main registration is performed by the process described above, the user is able to upload the medication history data to the data center 12 from the portable terminal device 14, and to update the medication history data recorded in the data center 12, or to browse the medication history data recorded in the data center 12 by downloading the data.

Figure 8:
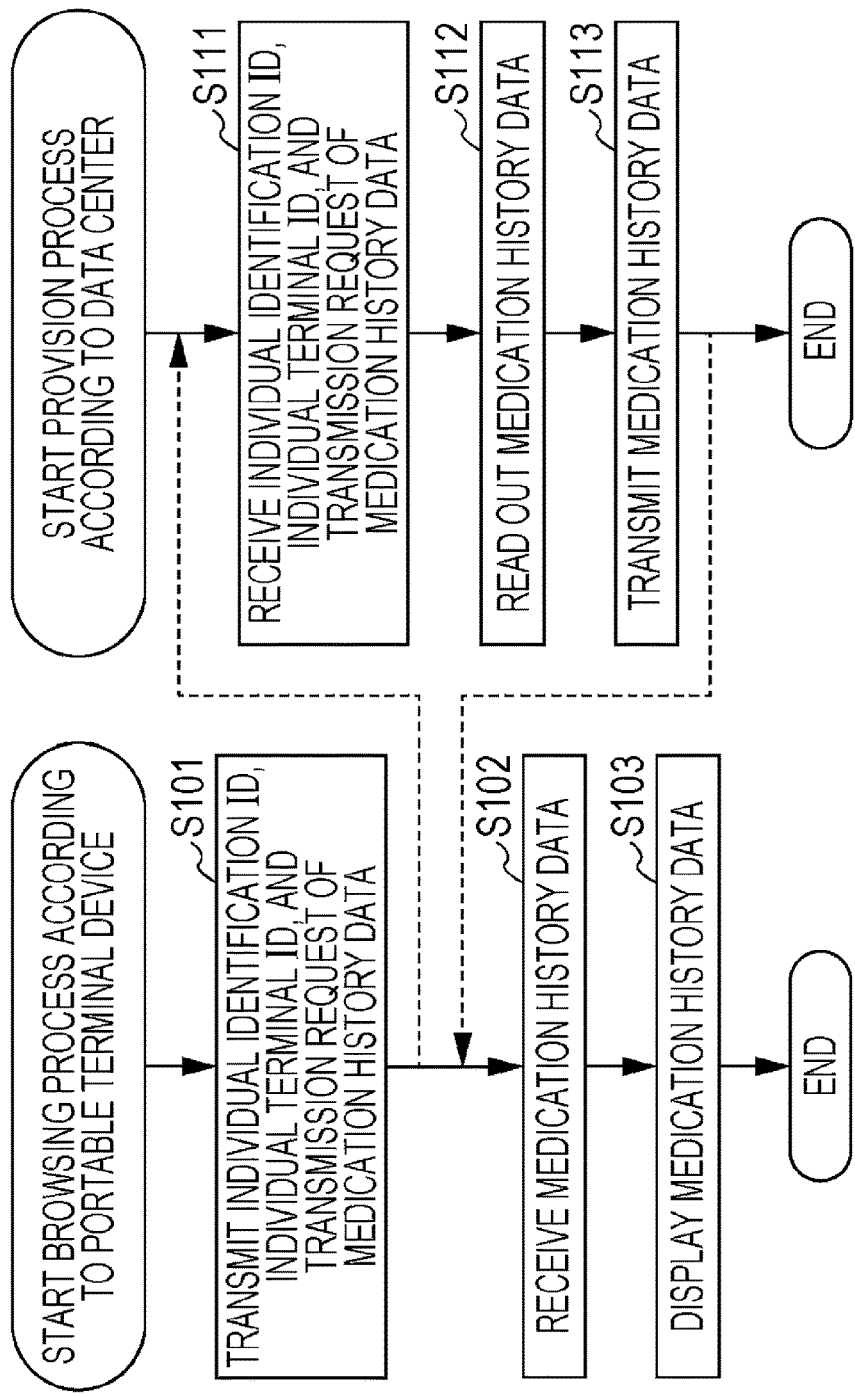
FIG. 8 is a flowchart for describing a browsing process and a provision process.

Hereinafter, a browsing process according to the portable terminal device 14, and a provision process according to the data center 12 which are performed at the time of browsing the medication history data will be described with reference to a flowchart of FIG. 8.

In Step S101, the communication unit 111 transmits the individual identification ID, the individual terminal ID, and the transmission request of the medication history data to the data center 12 through the communication network 15 or the like.

Specifically, when the user manipulates the input unit 113 of the portable terminal device 14, and instructs the browsing of the medication history data, the browsing control unit 123 creates a transmission request for requesting the transmission of the medication history data according to the information supplied from the input unit 113 by the manipulation of the user. In addition, the browsing control unit 123 controls the information management unit 122, and reads out the individual identification ID and the individual terminal ID from the recording unit 115.

Then, the browsing control unit 123 supplies the individual identification ID and the individual terminal ID, and the transmission request to the communication unit 111, and the communication unit 111 transmits the individual identification ID and the individual terminal ID, and the transmission request to the data center 12.

In Step S111, the communication unit 42 of the data center 12 receives the individual identification ID, the individual terminal ID, and the transmission request which are transmitted from the portable terminal device 14 to be supplied to the control unit 43.

In Step S112, the information management unit 53 reads out the medication history data associated with the individual identification ID and the individual terminal ID which are received by the communication unit 42 from the recording unit 41 according to the transmission request supplied from the communication unit 42. The information management unit 53 supplies the read out medication history data to the communication unit 42.

Furthermore, more specifically, the authentication process is performed between the portable terminal device 14 and the data center 12 at the time of browsing the medication history data, as necessary. For example, the fact that the portable terminal device 14 includes the access authority with respect to the medication history data is authenticated by a hashing operation or the like using the individual terminal ID and the individual identification ID.

In Step S113, the communication unit 42 transmits the medication history data supplied from the information management unit 53 to the portable terminal device 14 through the communication network 15 or the like, and the provision process is ended.

In addition, in Step S102, the communication unit 111 of the portable terminal device 14 receives the medication history data transmitted from the data center 12, and supplies the data to the control unit 114. The display control unit 124 supplies the medication history data supplied from the communication unit 111 to the display unit 116, and controls the display of the medication history data.

In Step S103, the display unit 116 displays the medication history data supplied from the display control unit 124, and the browsing process is ended. Thus, when the medication history data is displayed on the display unit 116, the user browses the medication history data, or edits the medication history data.

As described above, the portable terminal device 14 receives the medication history data by using the recorded individual identification ID and individual terminal ID, and displays the received medication history data. Thus, in the data center 12, the access with respect to the medication history data is managed by using the individual identification ID and the individual terminal ID, and thus it is possible to manage the access with respect to the data which is a browsing target such as medication history data for each of a plurality of portable terminal devices 14. Accordingly, it is possible to allow the medication history data to be simply and safely browsed. That is, it is possible to improve security and convenience.

<For Deletion of Individual Set Terminal Code and Individual Terminal ID>

However, according to any condition in which the user loses or replaces the registered portable terminal device 14, the portable terminal device 14 in which the registration is completed may allow the medication history data to be browsed, that is, the access authority with respect to the medication history data may be invalidated.

In such a case, the user is able to delete the individual set terminal code and the individual terminal ID by the portable terminal device 14 in which the registration is completed or the member store terminal device 11, and not to browse the medication history data from the portable terminal device 14. Hereinafter, a process performed in such a case will be described.

First, a deletion request process according to the member store terminal device 11, and a deletion process according to the data center 12 will be described with reference to a flowchart of FIG. 9.

Figure 9:
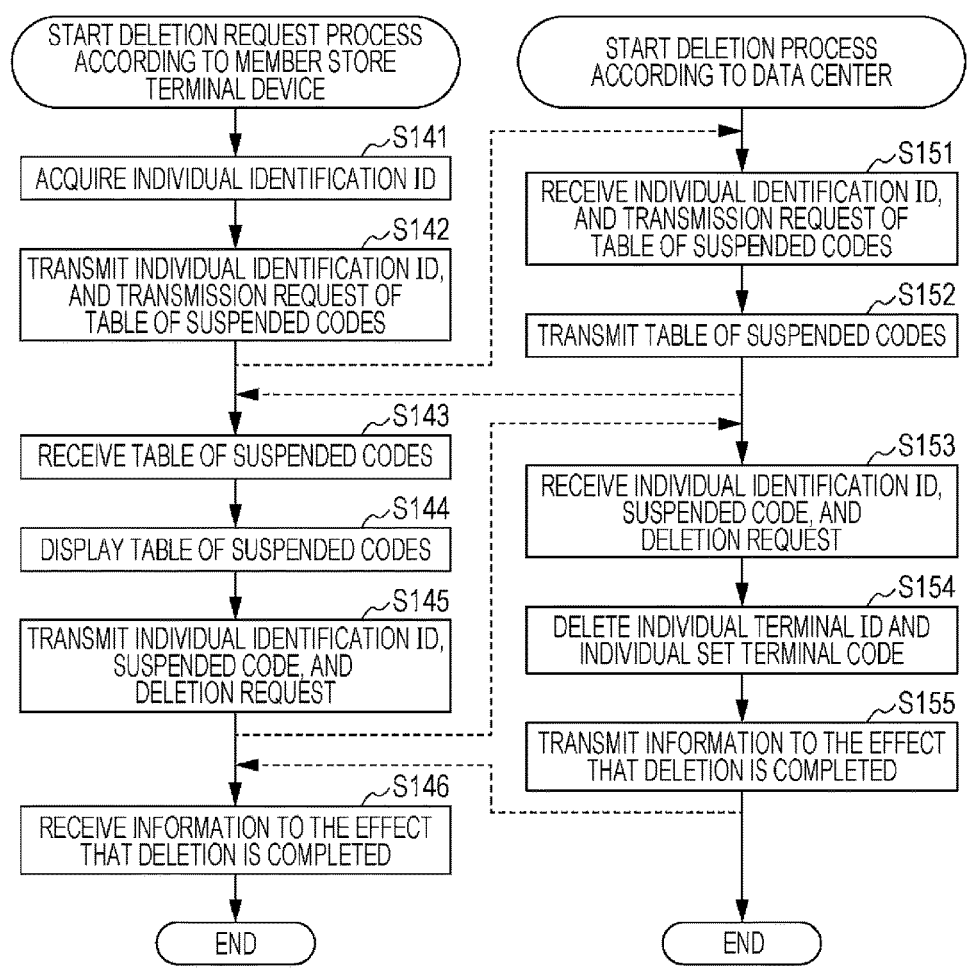
FIG. 9 is a flowchart for describing a deletion request process and a deletion process.

For example, as a case in which a process of the flowchart of FIG. 9 is performed, a case in which the owner of the IC card 13 allows the portable terminal device 14 carried by a wife or the like of the owner to use the service related to the IC card 13, but after that, the owner desires to suspend the use of the service is considered. In such a case, the user visits the service member store in which the member store terminal device 11 is disposed, notifies of the invalidation of the access authority of the registered portable terminal device 14, and holds the carried IC card 13 toward the member store terminal device 11.

Then, in Step S141, the information identification reader 81 of the member store terminal device 11 contactlessly communicates with the IC card 13, and acquires the individual identification ID and the individual information from the IC card 13 to be supplied to the control unit 85. Furthermore, when the user loses the IC card 13, or the like, the member store terminal device 11 may acquire the individual identification ID from the data center 12.

The control unit 85 supplies the individual information to the display unit 84 to be displayed as necessary, and the pharmacist or the like performs the identity verification by suitably using the displayed individual information.

In addition, the request processing unit 92 supplies the individual identification ID, and the transmission request of a table of the suspended codes to the communication unit 82, and instructs the transmission with respect to the data center 12.

In Step S142, the communication unit 82 transmits the individual identification ID, and the transmission request of the table of the suspended codes which are supplied from the request processing unit 92 to the data center 12 through the communication network 15.

Then, in Step S151, the communication unit 42 of the data center 12 receives the individual identification ID, and the transmission request of the table of the suspended codes which are transmitted from the member store terminal device 11 to be supplied to the control unit 43.

The registration management unit 51 of the control unit 43 controls the information management unit 53 according to the received transmission request, reads out all of the suspended codes associated with the received individual identification ID, that is, the individual set terminal code and the individual terminal ID from the recording unit 41, and creates a table of the suspended codes. Therefore, the registration management unit 51 supplies the created table to the communication unit 42.

In Step S152, the communication unit 42 transmits the table of the suspended codes supplied from the registration management unit 51 to the member store terminal device 11 through the communication network 15.

In Step S143, the communication unit 82 of the member store terminal device 11 receives the table of the suspended codes transmitted from the data center 12, and supplies the table to the control unit 85.

In Step S144, the control unit 85 supplies the table of the suspended codes supplied from the communication unit 82 to the display unit 84 to be displayed.

Thus, when the table of the suspended codes is displayed, the user manipulates the input unit 83, and selects the suspended code of the portable terminal device 14 for which the user desires to suspend the use of the service among the suspended codes.

Thus, in the suspended codes displayed in table, the individual set terminal code input by the user or the like is included, and in general, the individual set terminal code may be the information which is easy for the user or the like to remember. Therefore, the user is able to simply and reliably designate the portable terminal device 14 for which the user desires to suspend the use of the service by using the individual set terminal code as a hint.

For example, when only the individual set terminal code is displayed as the suspended code, each portable terminal device 14 is not able to be discriminated at the time of setting the same individual set terminal code with respect to a plurality of different portable terminal devices 14. However, in the present disclosure, it is possible to reliably specify the portable terminal device 14 by setting a combination of the individual set terminal code and the individual terminal ID as the suspended code.

When the suspended code, that is, the portable terminal device 14 is selected by the user, the control unit 85 acquires the information according to the manipulation of the user, that is, the information indicating the selected suspended code from the input unit 83. Then, the request processing unit 92 supplies the individual identification ID acquired in Step S141, and the suspended code selected by the user, and a deletion request for requesting a deletion of the information related to the portable terminal device 14 to the communication unit 82.

In Step S145, the communication unit 82 transmits the individual identification ID and the suspended code, and the deletion request to the data center 12 through the communication network 15.

In Step S153, the communication unit 42 of the data center 12 receives the individual identification ID and the suspended code, and the deletion request which are transmitted from the member store terminal device 11 to be supplied to the control unit 43.

In Step S154, the registration management unit 51 deletes the individual terminal ID and the individual set terminal code on the basis of the individual identification ID and the suspended code, and the deletion request which are supplied from the communication unit 42.

That is, the registration management unit 51 instructs the information management unit 53 to delete the individual terminal ID and the individual set terminal code which are the received suspended codes among the individual terminal IDs and the individual set terminal codes associated with the received individual identification ID according to the deletion request, and the information management unit 53 deletes the individual terminal ID and the individual set terminal code which are recorded in the recording unit 41. Thus, when the individual terminal ID and the individual set terminal code are deleted, the portable terminal device 14 specified by the individual terminal ID is not able to access the medication history data.

When the individual terminal ID and the individual set terminal code are deleted, the registration management unit 51 supplies the information to the effect that the deletion is completed to the communication unit 42. For example, in the information to the effect that the deletion is completed, the suspended code of the portable terminal device 14 in which the use of the service is suspended, that is, the access authority is invalidated is included.

In Step S155, the communication unit 42 transmits the information to the effect that the deletion is completed which is supplied from the registration management unit 51 to the member store terminal device 11 through the communication network 15, and the deletion process is ended.

In addition, in Step S146, the communication unit 82 of the member store terminal device 11 receives the information to the effect that the deletion is completed which is transmitted from the data center 12, and supplies the information to the control unit 85. The control unit 85 supplies the information supplied from the communication unit 82 to the display unit 84 to be displayed, and the deletion request process is ended. When the suspended code or the like of the portable terminal device 14 in which the use of the service is suspended is displayed on the display unit 84 as the received information, the user or the like is able to confirm that the individual terminal ID and the individual set terminal code are accurately deleted.

As described above, the member store terminal device 11 transmits the individual identification ID read out from the IC card 13, and the suspended code selected by the user to the data center 12, and deletes the individual terminal ID and the individual set terminal code.

Thus, by deleting the individual terminal ID and the individual set terminal code according to the individual identification ID and the suspended code, the user is able to delete the individual terminal ID and the individual set terminal code even when the user does not carry the portable terminal device 14. Accordingly, it is possible to improve security and convenience.

Furthermore, here, a case in which the user selects a desired suspended code from the suspended codes displayed in a table is described, but the user may directly manipulate the input unit 83, and may input the stored suspended code. In such a case, the communication unit 82 transmits the suspended code input by the user, and the individual identification ID and the deletion request to the data center 12. Further, the use of the service may be suspended by inputting the individual set terminal code by the user.

Figure 10:
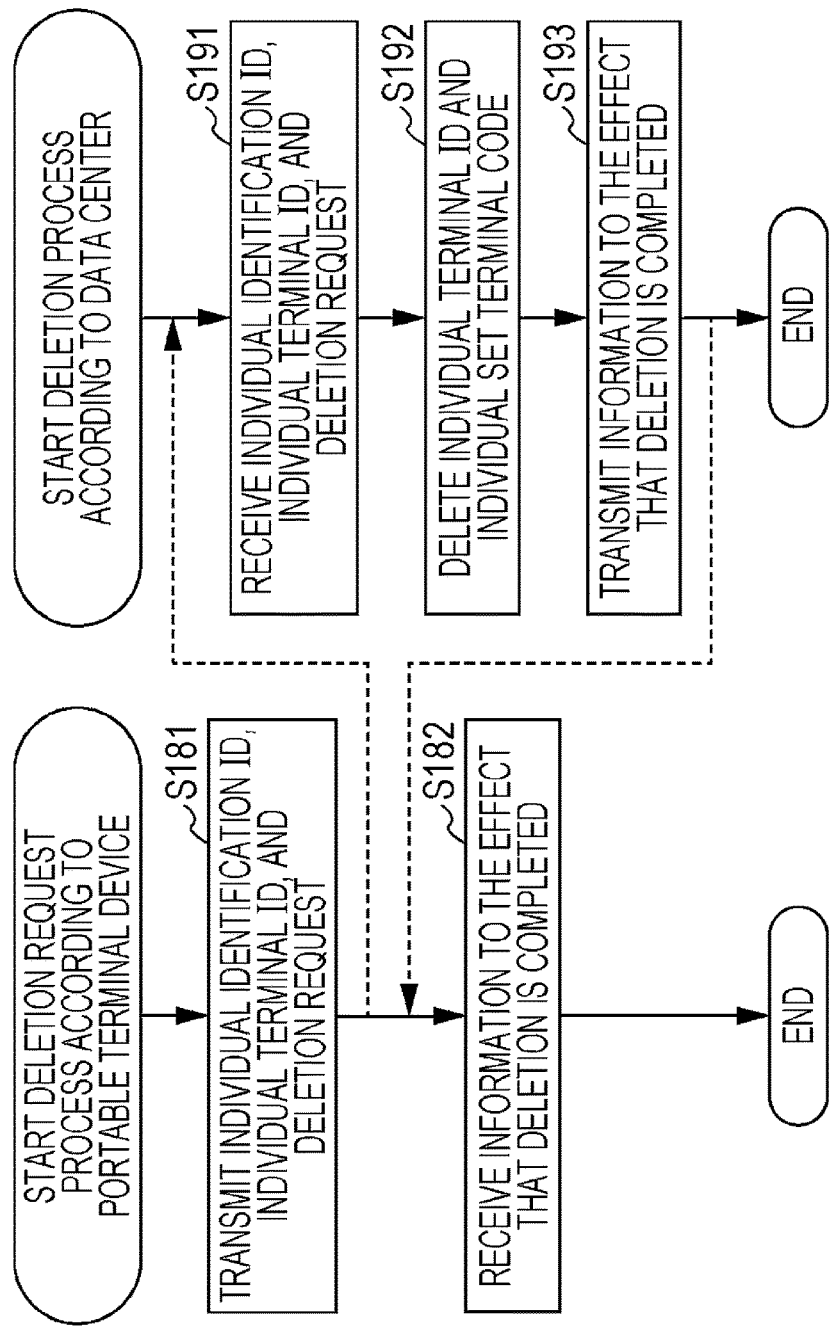
FIG. 10 is a flowchart for describing a deletion request process and a deletion process.

In addition, the user is able to delete the individual terminal ID and the individual set terminal code by manipulating the portable terminal device 14 without visiting the service member store. In such a case, a process illustrated in FIG. 10 is performed. Hereinafter, a deletion request process performed by the portable terminal device 14, and a deletion process performed by the data center 12 will be described with reference to a flowchart of FIG. 10.

First, the user manipulates the portable terminal device 14 to which the individual terminal ID to be deleted is applied, and instructs the deletion of the individual terminal ID and the individual set terminal code.

Then, in Step S181, the communication unit 111 transmits the individual identification ID and the individual terminal ID, and the deletion request to the data center 12 through the communication network 15 or the like.

That is, the browsing control unit 123 controls the information management unit 122 according to the instruction of the user, reads out the individual identification ID and the individual terminal ID from the recording unit 115, and creates a deletion request for requesting the deletion of the individual terminal ID and the individual set terminal code. That is, the deletion request for requesting the invalidation of the access authority with respect to the data is created on the basis of the individual identification ID and the individual terminal ID.

The browsing control unit 123 supplies the individual identification ID and the individual terminal ID, and the deletion request to the communication unit 111, and the communication unit 111 transmits the individual identification ID and the individual terminal ID, and the deletion request which are supplied from the browsing control unit 123.

In Step S191, the communication unit 42 of the data center 12 receives the individual identification ID and the individual terminal ID, and the deletion request which are transmitted from the portable terminal device 14 to be supplied to the control unit 43.

In Step S192, the registration management unit 51 deletes the individual terminal ID and the individual set terminal code on the basis of the individual identification ID and the individual terminal ID, and the deletion request which are supplied from the communication unit 42.

That is, the registration management unit 51 instructs the information management unit 53 to delete the received individual terminal ID, and the individual set terminal code associated with the received individual identification ID and individual terminal ID according to the deletion request. The information management unit 53 deletes the individual terminal ID and the individual set terminal code which are recorded in the recording unit 41 according to the instruction of the registration management unit 51. Thus, when the individual terminal ID and the individual set terminal code are deleted, the portable terminal device 14 specified by the individual terminal ID is not able to access the medication history data.

When the individual terminal ID and the individual set terminal code are deleted, the registration management unit 51 supplies the information to the effect that the deletion is completed to the communication unit 42. In the information to the effect that the deletion is completed, the suspended code of the portable terminal device 14 in which the use is suspended as necessary, that is, the individual set terminal code and the individual terminal ID may be included.

In Step S193, the communication unit 42 transmits the information to the effect that the deletion is completed which are supplied from the registration management unit 51 to the portable terminal device 14 through the communication network 15, and the deletion process is ended.

In addition, in Step S182, the communication unit 111 of the portable terminal device 14 receives the information to the effect that the deletion is completed which is transmitted from the data center 12, and supplies the information to the control unit 114. The display control unit 124 supplies the information supplied from the communication unit 111 to the display unit 116 to be displayed, and the deletion request process is ended. When the information received by the display unit 116 is displayed, the user is able to confirm that the individual terminal ID and the individual set terminal code are deleted. Particularly, when the suspended code is displayed, the user is able to more reliably grasp the portable terminal device 14 in which the use of the service is suspended.

As described above, the portable terminal device 14 transmits the recorded individual identification ID and individual terminal ID to the data center 12, and deletes the individual terminal ID and the individual set terminal code. Thus, when the deletion of the individual terminal ID and the individual set terminal code is instructed by manipulating the portable terminal device 14 which is a deletion target, the user is able to simply delete the individual terminal ID and the individual set terminal code without inputting the suspended code. Accordingly, it is possible to improve security and convenience.

Furthermore, in this case, the individual identification ID, and the suspended code input by the user may be transmitted to the data center 12, and the individual terminal ID and the individual set terminal code may be deleted.

Second Embodiment

<For Main Registration>

Further, as described above, a case in which the main registration is completed when the individual set terminal code is recorded is described, but in order to further improve security, the issued individual terminal ID may be invalidated when the main registration is not performed within a predetermined time period after the provisional registration.

In such a case, in the recording unit 41 of the data center 12, for example, a registration deadline illustrated in FIG. 11 is recorded. Furthermore, in FIG. 11, a description with respect to a configuration corresponding to that of FIG. 3 will be properly omitted.

In a database illustrated in FIG. 11, the registration deadline for each individual terminal ID is further recorded in association with each individual identification ID in the database illustrated in FIG. 3. The registration deadline indicates a deadline for validation of the individual terminal ID issued by the provisional registration, and when the user does not complete the main registration before the date indicated by the registration deadline, the access using the issued individual terminal ID is difficult. For example, the registration deadline is a predetermined period of time such as a month from the date when the provisional registration is completed, and when the main registration is completed, a section of the registration deadline is rewritten to the information indicating completion of the registration.

In an example of FIG. 11, for example, the main registration is completed within the registration deadline with respect to the individual terminal ID "1" associated with the individual identification ID "ab02", and the section is rewritten to "registration completion". On the other hand, for example, with respect to the individual terminal ID "2" associated with the individual identification ID "ab02", the provisional registration is performed, but the main registration is not yet performed, and thus the registration deadline of the main registration is "2005/3/2". The registration deadline is recorded in association with the individual identification ID and the individual terminal ID, for example at the time of the provisional registration. In addition, in this example, with respect to the individual terminal ID "2" associated with the individual identification ID "ab02", the individual set terminal code is not yet recorded.

After such a provisional registration, when the main registration is not performed within a predetermined period of time, in the provisional registration process described with reference to FIG. 6, the registration deadline is also recorded at the time of recording the individual terminal ID in Step S23. That is, the registration management unit 51 of the data center 12 creates a registration deadline according to the current time, and the information management unit 53 supplies the registration deadline to the recording unit 41 according to the instruction of the registration management unit 51 to be recorded. In such a case, the created registration deadline may be transmitted to the member store terminal device 11, and the registration deadline may be displayed on the member store terminal device 11 or the portable terminal device 14.

Figure 12:
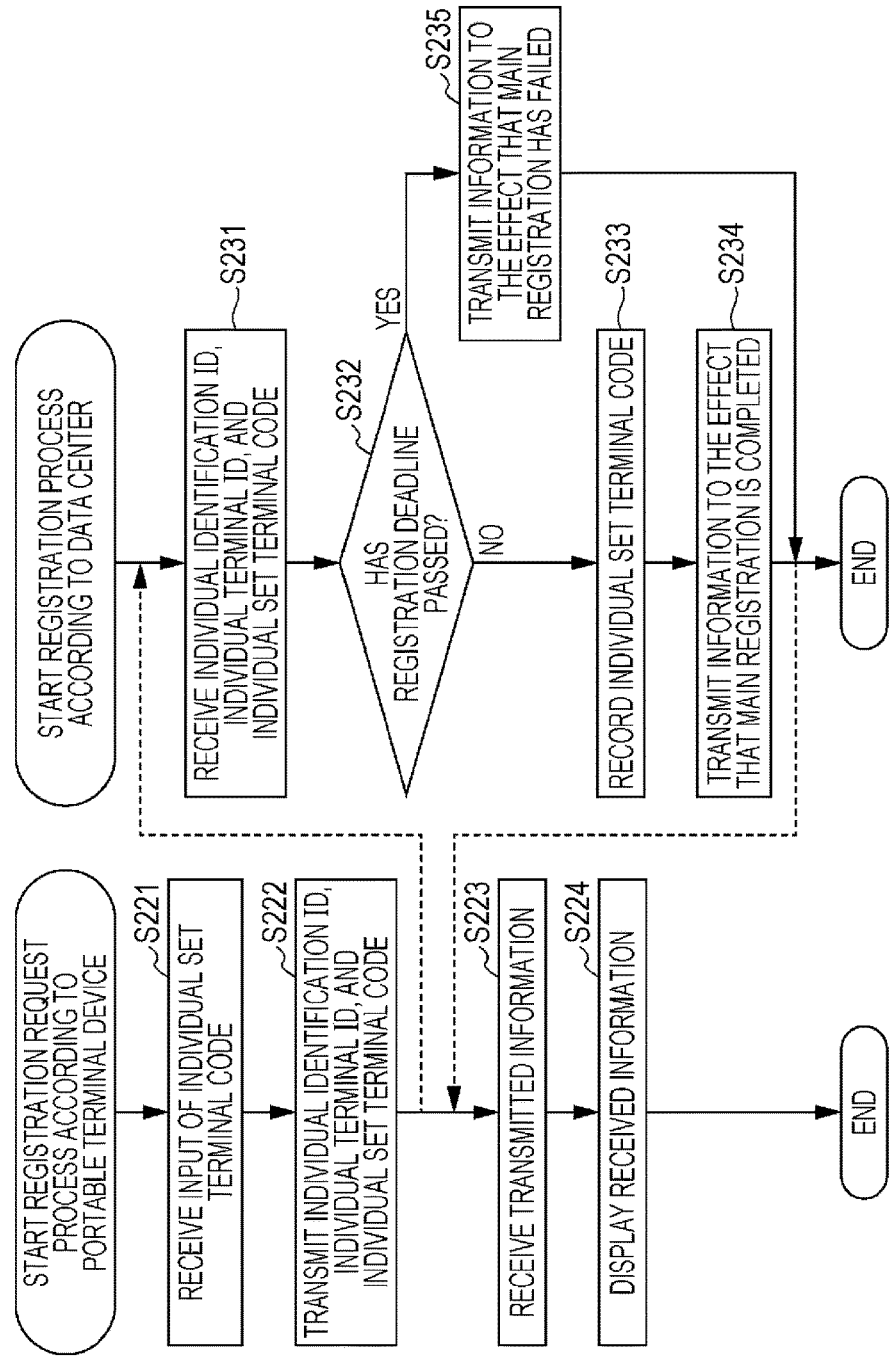
FIG. 12 is a flowchart for describing a registration request process and a registration process.

In addition, after the provisional registration, when the main registration is not performed within a predetermined period of time, for example, a process illustrated in FIG. 12 is performed at the time of the main registration. Hereinafter, a registration request process according to the portable terminal device 14, and a registration process according to the data center 12 will be described with reference to a flowchart of FIG. 12. Furthermore, since processes of Step S221, Step S222, and Step S231 are identical to the processes of Step S61, Step S62, and Step S71 of FIG. 7, the description thereof will be omitted.

In Step S232, the registration management unit 51 determines whether or not the registration deadline has passed with respect to the portable terminal device 14 which is requested to be registered. Specifically, when the current time exceeds the registration deadline which is recorded in the recording unit 41 in association with the received individual identification ID and individual terminal ID, the registration management unit 51 determines that the registration deadline has passed.

Figure 7:
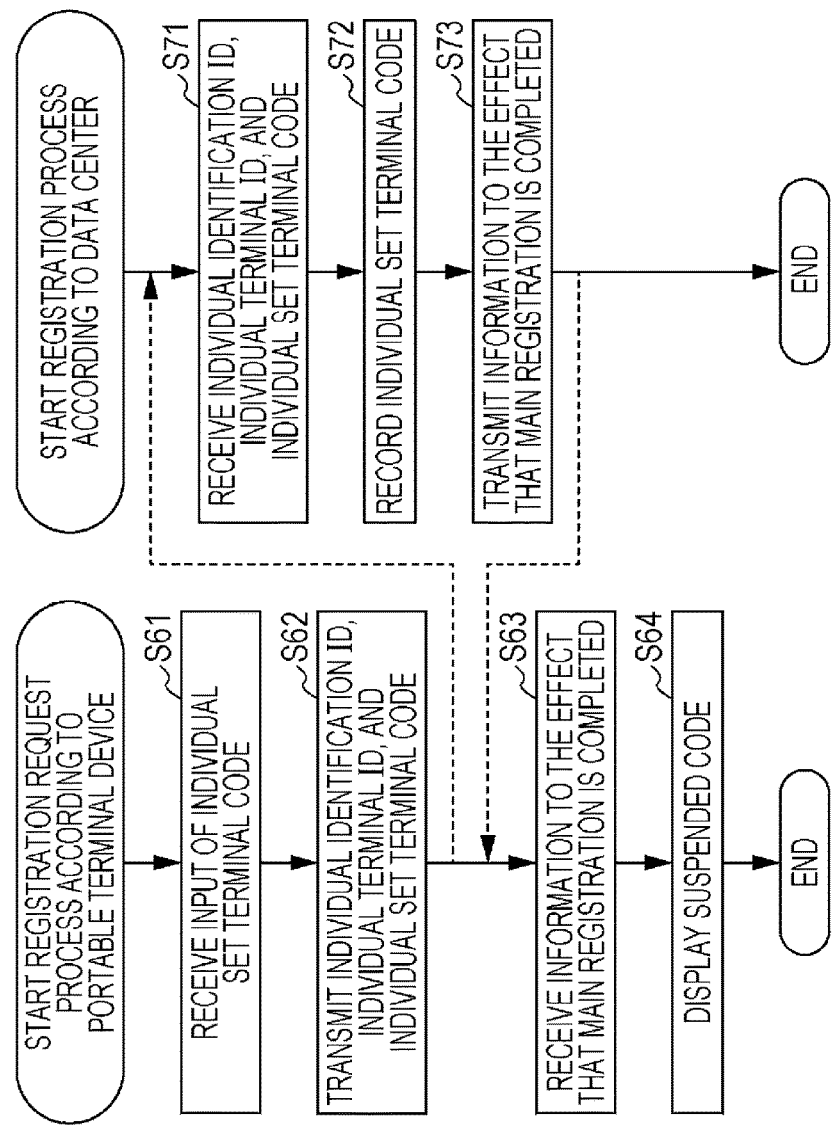
FIG. 7 is a flowchart for describing a registration request process and a registration process.

In Step S232, when it is determined that the registration deadline has not passed, subsequently, processes of Step S233 and Step S234 are performed, and the registration process is ended, but the processes are identical to the processes of Step S72 and Step S73 of FIG. 7, and thus the description will be omitted.

In this regard, in Step S232, when it is determined that the registration deadline has passed, the registration management unit 51 supplies the information to the effect that the main registration has failed due to exceeding the registration deadline to the communication unit 42, instructs the transmission of the information, and the process proceeds to Step S235.

In Step S235, the communication unit 42 transmits the information to the effect that the main registration has failed which is supplied from the registration management unit 51 to the portable terminal device 14, and the registration process is ended.

In addition, when the process of Step S234 or Step S235 is performed, in Step S223, the communication unit 111 of the portable terminal device 14 receives the information transmitted from the data center 12, and supplies the information to the control unit 114.

In Step S224, the display control unit 124 supplies the information supplied from the communication unit 111 to the display unit 116 to be displayed, and the registration request process is ended. In this case, on the display unit 116, the information to the effect that the main registration is completed, or the information to the effect that the main registration has failed is displayed. In addition, when the information to the effect that the main registration is completed is displayed, the suspended code included in the information received from the data center 12 is also displayed.

As described above, the data center 12 determines whether or not to allow the main registration on the basis of the registration deadline, and performs the main registration according to the determined result. Thus, by setting the registration deadline, it is possible to further improve security.

Third Embodiment

<For Expiration Date of Individual Terminal ID>

In addition, in order to improve security, an expiration date of each individual terminal ID may be set. In such a case, in the recording unit 41 of the data center 12, for example, the expiration date illustrated in FIG. 13 is recorded. Furthermore, in FIG. 13, a description with respect to a configuration corresponding to that of FIG. 3 will be properly omitted.

In a database illustrated in FIG. 13, the expiration date for each individual terminal ID is recorded in association with each individual identification ID in the database illustrated in FIG. 3. The expiration date indicates an expiration date before which the access with respect to the medication history data is possible by using the issued individual terminal ID, and when the expiration date has passed, the access with respect to the medication history data is not possible by this individual terminal ID. For example, the expiration date is a time after a predetermined period of time such as half a decade from a date when the main registration is completed. Furthermore, the expiration date of the individual terminal ID may be suitably updated.

In FIG. 13, for example, the expiration date of the individual terminal ID "1" associated with the individual identification ID "ab01" is "2005/2/12".

After such a main registration, when the individual terminal ID is valid only for a predetermined period of time, the expiration date is also recorded at the time of recording the individual set terminal code in Step S72 in the registration process described with reference to FIG. 7. That is, the registration management unit 51 of the data center 12 creates the expiration date according to the current time, and the information management unit 53 supplies the expiration date to the recording unit 41 to be recorded according to the instruction of the registration management unit 51. In such a case, the expiration date may be included in the information to the effect that the main registration is completed which is transmitted in Step S73, and the expiration date may be displayed on the portable terminal device 14 in Step S64.

Figure 14:
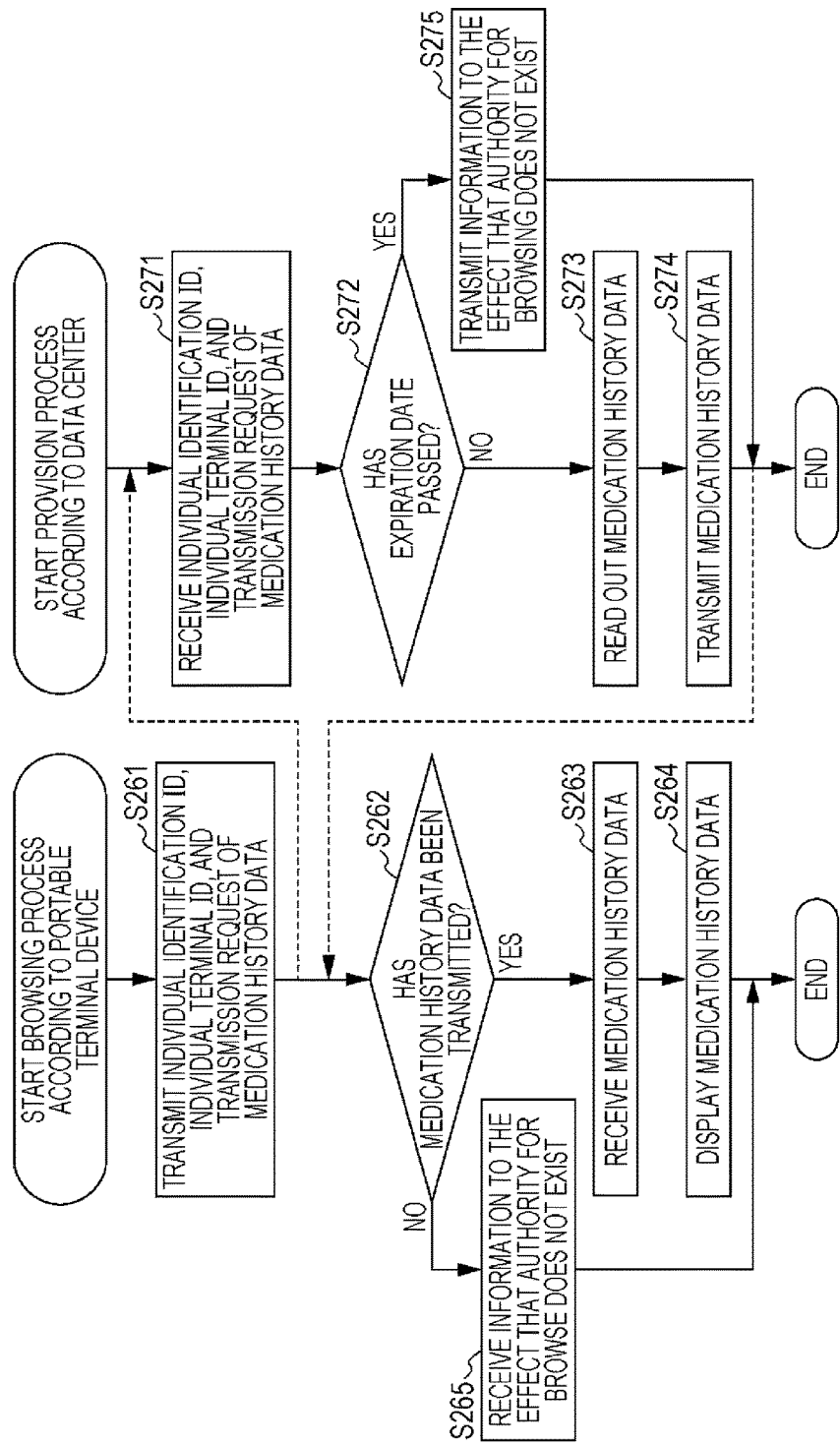
FIG. 14 is a flowchart for describing a browsing process and a provision process.

In addition, when the expiration date is set in the individual terminal ID, for example, a process illustrated in FIG. 14 is performed at the time of browsing the medication history data. Hereinafter, a browsing process according to the portable terminal device 14, and a provision process according to the data center 12 will be described with reference to a flowchart of FIG. 14. Furthermore, since processes of Step S261 and Step S271 are identical to the processes of Step S101 and Step S111 of FIG. 8, the description thereof will be omitted.

In Step S272, the information management unit 53 determines whether or not the expiration date of the individual terminal ID associated with the individual identification ID has passed, that is, whether or not to allow the requested browsing of the medication history data, on the basis of the received individual identification ID and individual terminal ID. For example, when the current time exceeds the expiration date which is recorded in the recording unit 41 in association with the received individual identification ID and individual terminal ID, it is determined that the expiration date has passed.

In Step S272, when it is determined that the expiration date has not passed, subsequently, processes of Step S273 and Step S274 are performed, and the provision process is ended. Furthermore, since the processes are identical to the processes of Step S112 and Step S113 of FIG. 8, the description thereof will be omitted.

On the other hand, in Step S272, when it is determined that the expiration date has passed, the information management unit 53 supplies the information to the effect that authority for browsing does not exist due to exceeding the expiration date to the communication unit 42, and instructs the transmission of the information, and the process proceeds to Step S275.

In Step S275, the communication unit 42 transmits the information to the effect that authority for browsing does not exist which is supplied from the information management unit 53 to the portable terminal device 14, and the provision process is ended.

In addition, when the process of Step S274 or Step S275 is performed, in Step S262, the communication unit 111 of the portable terminal device 14 determines whether or not the medication history data has been transmitted.

In Step S262, when it is determined that the medication history data has been transmitted, subsequently, processes of Step S263 and Step S264 are performed, and the browsing process is ended. Furthermore, since the processes are identical to the processes of Step S102 and Step S103 of FIG. 8, the description thereof will be omitted.

In the regard, in Step S262, when it is determined that the medication history data has not been transmitted, the information to the effect that authority for browsing does not exist is transmitted from the data center 12, and thus a process of Step S265 is performed.

That is, in Step S265, the communication unit 111 receives the information to the effect that authority for browsing does not exist which is transmitted from the data center 12, and supplies the information to the control unit 114. Then, the display control unit 124 supplies the information supplied from the communication unit 111 to the display unit 116 to be displayed, and the browsing process is ended. In this case, on the display unit 116, the information to the effect that authority for browsing does not exist is displayed.

As described above, the data center 12 determines whether or not to allow the browsing of the medication history data on the basis of the expiration date of the individual terminal ID, and transmits the medication history data according to the determined result. Thus, by setting the expiration date in the individual terminal ID, it is possible to prevent abusive access and to further improve security.

Fourth Embodiment

<For Suspending Use of Service>

In addition, in the example described above, the individual set terminal code is included in the suspended code as auxiliary information for enabling the user to easily understand which portable terminal device 14 is suspended from using the service, that is, as information which is a hint. However, with respect to a user other than the user who inputs the individual set terminal code, the individual set terminal code is not limited to the information which is easy for the user to remember.

Therefore, when an operation of suspending the use of the service is performed, the information related to the registration of the portable terminal device 14 may be recorded in the data center 12 side as the auxiliary information for enabling the user to further simply and reliably designate the desired portable terminal device 14.

Here, the information related to the registration may be, for example, individually specified auxiliary information or the like such as a year of birth or a gender of the user who carries the registered portable terminal device 14, or a relationship with respect to the owner of the IC card 13, which is not the individual information of the user, but is auxiliary (a hint) for specifying the user. In addition, the information related to the registration may be information or the like indicating a registration date of the portable terminal device 14, or a store such as a pharmacy in which the registration is performed.

The information related to the registration recorded in the data center 12 side, may be any information insofar as the information is the auxiliary information which is auxiliary for specifying the desired portable terminal device 14, and hereinafter, an example in which the year of birth and the gender are used as the information related to the registration will be described.

In such a case, in the recording unit 41 of the data center 12, for example, the year of birth and the gender are recorded as illustrated in FIG. 15. Furthermore, in FIG. 15, a description with respect to a configuration corresponding to that of FIG. 3 will be properly omitted.

In a database illustrated in FIG. 15, the year of birth and the gender of the owner of the portable terminal device 14 for each individual terminal ID which is specified by the individual terminal ID are recorded in association with each individual identification ID in the database illustrated in FIG. 3.

The year of birth and the gender are not the individual information since the year of birth and the gender are not able to specify the individual by themselves, but are information which is a hint (auxiliary) at the time of specifying the portable terminal device 14 for a person such as the owner of the IC card 13 who knows the owner of the portable terminal device 14.

<For Main Registration>

Figure 16:
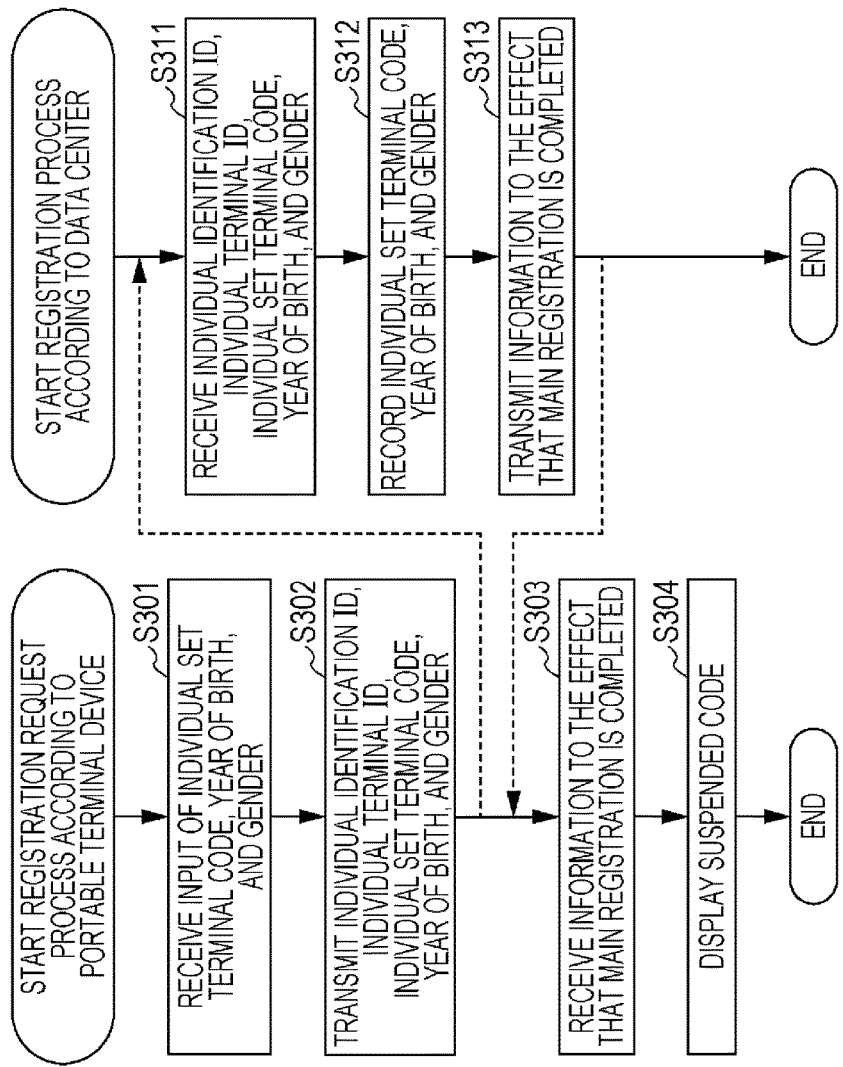
FIG. 16 is a flowchart for describing a registration request process and a registration process.

Thus, when the year of birth and the gender are recorded in association with the individual terminal ID, a process illustrated in FIG. 16 is performed at the time of the main registration of the individual terminal ID. Hereinafter, a registration request process according to the portable terminal device 14, and a registration process according to the data center 12 will be described with reference to a flowchart of FIG. 16.

In Step S301, the browsing control unit 123 of the portable terminal device 14 receives an input of the individual set terminal code, the year of birth, and the gender by the user.

For example, the user who is the owner of the portable terminal device 14 in which the main registration is performed manipulates the input unit 113, and inputs the individual set terminal code, and the year of birth and the gender of the user themselves. Then, the information is supplied to the control unit 114 from the input unit 113, according to the manipulation of the user.

In addition, the information management unit 122 reads out the individual identification ID and the individual terminal ID from the recording unit 115 according to the instruction of the browsing control unit 123. The browsing control unit 123 supplies the read out individual identification ID and individual terminal ID, and the individual set terminal code, the year of birth, and the gender which are supplied from the input unit 113 to the communication unit 111.

In Step S302, the communication unit 111 transmits the individual identification ID, the individual terminal ID, the individual set terminal code, the year of birth, and the gender which are supplied from the browsing control unit 123 to the data center 12 through the communication network such as the communication network 15.

Then, in Step S311, the communication unit 42 of the data center 12 receives the individual identification ID, the individual terminal ID, the individual set terminal code, the year of birth, and the gender which are transmitted from the portable terminal device 14 to be supplied to the control unit 43.

In Step S312, the registration management unit 51 controls the information management unit 53 on the basis of the individual identification ID, the individual terminal ID, the individual set terminal code, the year of birth, and the gender which are supplied from the communication unit 42, and records the individual set terminal code, the year of birth, and the gender in the recording unit 41. That is, in the recording unit 41, the individual set terminal code, the year of birth, and the gender are recorded in association with the individual identification ID and the individual terminal ID which are identical to the received individual identification ID and individual terminal ID among the recorded individual identification IDs and individual terminal IDs.

Accordingly, in the recording unit 41, the individual terminal ID, the individual set terminal code, the year of birth, and the gender for each portable terminal device 14 are further recorded in association with the individual identification ID. Thus, when the individual set terminal code, the year of birth, and the gender are recorded, the main registration of the portable terminal device 14 is completed.

When the main registration is completed, subsequently, a process of Step S313 is performed by the data center 12, and the registration process is ended, in addition, in the portable terminal device 14, processes of Step S303 and Step S304 are performed, and the registration request process is ended. Furthermore, since the processes of Step S313, Step S303, and Step S304 are identical to the processes of Step S73, Step S63, and Step S64 of FIG. 7, the description thereof will be omitted.

For example, in Step S304, the suspended code is displayed on the display unit 116 of the portable terminal device 14, but the registered year of birth or gender may also be displayed together with the suspended code.

As described above, the portable terminal device 14 transmits the individual set terminal code input by the user, the year of birth, and the gender, and the individual identification ID and the individual terminal ID to the data center 12, and the data center 12 records the individual set terminal code, the year of birth, and the gender in association with the individual terminal ID.

Thus, the individual set terminal code, the year of birth, and the gender for each portable terminal device 14 are recorded in the data center 12, and thus the user is able to more simply and reliably select the desired portable terminal device 14 at the time of selecting the specific portable terminal device 14.

<For Deletion of Individual Set Terminal Code and Individual Terminal ID>

Figure 17:
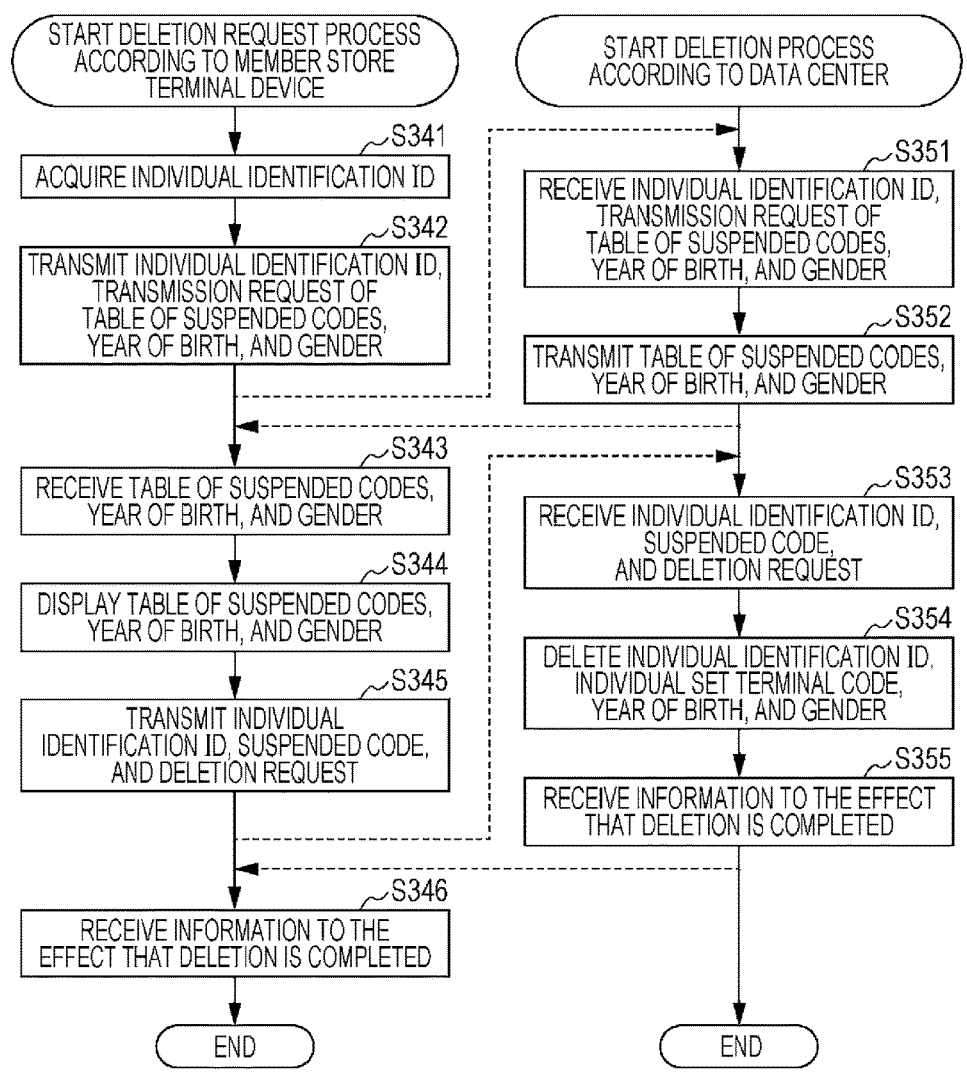
FIG. 17 is a flowchart for describing a deletion request process and a deletion process.

In addition, thus, when the individual set terminal code, the year of birth, and the gender for each portable terminal device 14 are recorded in the data center 12, a process illustrated in FIG. 17 is performed at the time of suspending the use of the service by the specific portable terminal device 14, that is, at the time of invalidating the access authority. Hereinafter, a deletion request process according to the member store terminal device 11, and a deletion process according to the data center 12 will be described with reference to a flowchart of FIG. 17.

Furthermore, since a process of Step S341 is identical to the process of Step S141 of FIG. 9, the description thereof will be omitted.

In Step S341, when the individual identification ID is acquired, the request processing unit 92 supplies the individual identification ID, and a transmission request of a table of the suspended code, the year of birth, and the gender to the communication unit 82, and instructs the transmission with respect to the data center 12.

In Step S342, the communication unit 82 transmits the individual identification ID, and the transmission request of the table of the suspended code, the year of birth, and the gender which are supplied from the request processing unit 92 to the data center 12 through the communication network 15.

Then, in Step S351, the communication unit 42 of the data center 12 receives the individual identification ID, and the transmission request of the table of the suspended code, the year of birth, and the gender which are transmitted from the member store terminal device 11 to be supplied to the control unit 43.

The registration management unit 51 of the control unit 43 reads out the entire suspended code, year of birth, and gender which are associated with the received individual identification ID from the recording unit 41 according to the received transmission request, and creates a table of the suspended code, the year of birth, and the gender. Therefore, the registration management unit 51 supplies the created table to the communication unit 42.

In Step S352, the communication unit 42 transmits the table of the suspended code, the year of birth, and the gender which is supplied from the registration management unit 51 to the member store terminal device 11 through the communication network 15.

In Step S343, the communication unit 82 of the member store terminal device 11 receives the table of the suspended code, the year of birth, and the gender which is transmitted from the data center 12, and supplies the table to the control unit 85.

In Step S344, the control unit 85 supplies the table of the suspended code, the year of birth, and the gender which is supplied from the communication unit 82 to the display unit 84 to be displayed.

Thus, when the table of the suspended code, the year of birth, and the gender is displayed, subsequently, processes of Step S345 and Step S346 are performed, and the deletion request process is ended, in addition, processes of Step S353 to Step S355 are performed, and the deletion process is ended. Furthermore, since the processes of Step S345, Step S346, and Step S353 to Step S355 are identical to the processes of Step S145, Step S146, and Step S153 to Step S155 of FIG. 9, the description thereof will be omitted.

However, in Step S354, the year of birth and the gender are further deleted in addition to the individual terminal ID and the individual set terminal code. In addition, in the data center 12, suspension of the use of the service is requested with respect to the portable terminal device 14 specified by the suspended code, the year of birth, and the gender which are selected from the displayed table. That is, the individual terminal ID and the individual identification ID of the portable terminal device 14 are transmitted to the data center 12.

As described above, when the year of birth and the gender are displayed in a table together with the suspended code, the year of birth and the gender are the auxiliary information for selecting the right portable terminal device 14. Accordingly, the user is able to simply and reliably designate the portable terminal device 14 for which the user desires to suspend the use of the service. Furthermore, in the process of Step S346, the year of birth and the gender may be also displayed together with the suspended code.

Furthermore, in the above description, a case in which the individual user is specified by the individual identification ID of the IC card 13 which is issued by a cloud service provider is described as an example. However, when it is guaranteed that the individual identification ID for identifying the user is unique, the same information processing system is able to be configured on the basis of a unique ID or the like which is adopted by the service member store.

However, a series of processes described above may be executed by hardware, and may be executed by software. When the series of processes are executed by software, a program which configures the software is installed in a computer. Here, as the computer, a computer assembled in dedicated hardware, a computer which is able to execute various functions by installing various programs, for example, a general-purpose computer, and the like are included.

Figure 18:
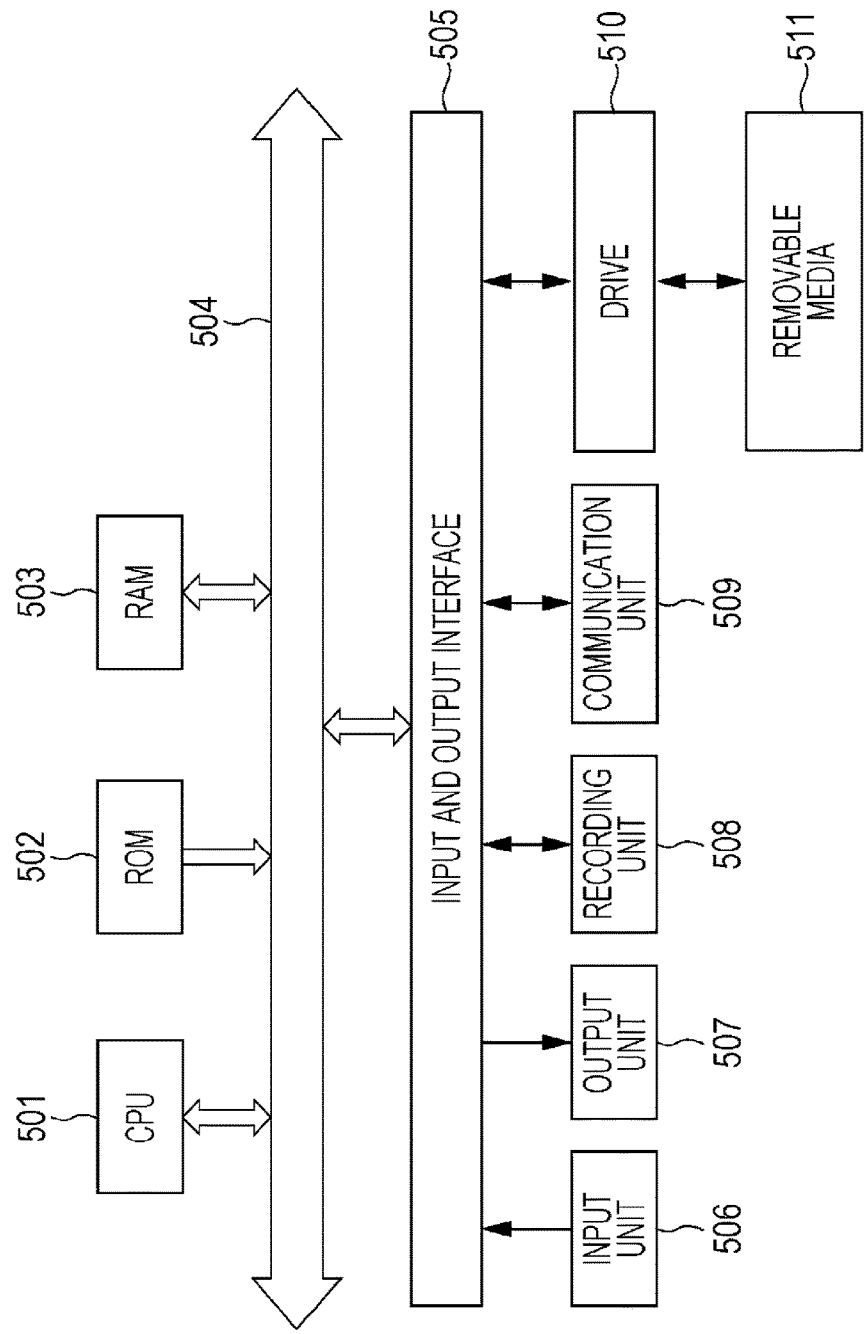
FIG. 18 is a diagram illustrating a configuration example of a computer.

FIG. 18 is a block diagram illustrating a configuration example of computer hardware which executes the series of processes described above by a program.

In the computer, a Central Processing Unit (CPU) 501, a Read Only Memory (ROM) 502, and a Random Access Memory (RAM) 503 are connected to each other through a bus 504.

The bus 504 is further connected to an input and output interface 505. An input unit 506, an output unit 507, a recording unit 508, a communication unit 509, and a drive 510 are connected to the input and output interface 505.

The input unit 506 includes a keyboard, a mouse, a microphone, an imaging element, or the like. The output unit 507 includes a display, a speaker, or the like. The recording unit 508 includes hard disk or a non-volatile memory or the like. The communication unit 509 includes a network interface or the like. The drive 510 drives removable media 511 such as a magnetic disk, an optical disc, a magnetic optical disc, or a semi-conductor memory.

In the computer configured as described above, the CPU 501 loads, for example, a program recorded in the recording unit 508 to the RAM 503 through the input and output interface 505 and the bus 504, and executes the program, and thus the series of processes described above are performed.

The program which is executed by the computer (the CPU 501) is able to be provided, for example, by being recorded on the removable media 511 such as package media. In addition, the program is able to be provided through a wired or wireless transmission medium such as a local area network, the Internet, and digital satellite broadcasting.

In the computer, the program may be installed in the recording unit 508 through the input and output interface 505 by mounting the removable media 511 on the drive 510. In addition, the program is able to be received by the communication unit 509 through the wired or wireless transmission medium, and to be installed in the recording unit 508. In addition, the program is able to be installed in the ROM 502 or the recording unit 508 in advance.

Furthermore, the program executed by the computer may be a program in which the processes are performed in chronological order according to the order described herein, and may be a program in which the processes are performed in parallel, or at the necessary timing such as the timing of calling.

In addition, the embodiments of the present disclosure are not limited to the embodiments described above, and may be variously changed in the range without departing from the gist of the present disclosure.

For example, the present disclosure may be configured as cloud computing which shares one function among a plurality of devices and processes the functions in cooperation with each other through a network.

In addition, each step described in the flowchart described above is able to be executed by being shared by a plurality of devices, in addition to executing the process by one device.

Further, when a plurality of processes is included in one step, the plurality of processes included in the one step is able to be executed by being shared by a plurality of devices, in addition to executing the process by one device.

In addition, the effects disclosed herein are merely exemplifications and not limited. In addition, additional effects may be obtained.

Further, the present disclosure is able to be configured as the following.

(1) An information processing apparatus, including: a reception unit which receives individual identification information for identifying a user; a creation unit which creates terminal identification information for identifying a terminal device used at the time of accessing data associated with the individual identification information; a recording unit which records the terminal identification information for one or each of a plurality of terminal devices in association with the individual identification information; and a transmission unit which transmits the terminal identification information.

(2) The information processing apparatus according to (1), in which when the reception unit receives the individual identification information and the terminal identification information, and a transmission request of the data from the terminal device, the transmission unit transmits the data associated with the received individual identification information to the terminal device to be identified by the received terminal identification information.

(3) The information processing apparatus according to (1) or (2), further including: a registration management unit which invalidates access with respect to the data associated with the received individual identification information according to the terminal device to be identified by the received terminal identification information when the reception unit receives the individual identification information and the terminal identification information, and an invalidation request of the access with respect to the data.

(4) The information processing apparatus according to (3), in which the recording unit further records auxiliary information related to a registration of the terminal device to be identified by the terminal identification information in association with the individual identification information and the terminal identification information,
the transmission unit transmits a list of the terminal identification information and the auxiliary information which are associated with the individual identification information, and the registration management unit invalidates the access of the terminal device to be specified by the terminal identification information and the auxiliary information which are selected from the list.

(5) The information processing apparatus according to (4), in which the reception unit receives the auxiliary information which is input by the terminal device and transmitted from the terminal device, and the recording unit records the auxiliary information which is received by the reception unit in association with the individual identification information and the terminal identification information.

(6) The information processing apparatus according to (4) or (5), in which the auxiliary information is a character string which is input by the terminal device.

(7) The information processing apparatus according to (6), in which at least any one of a year of birth, a gender, and a relationship with respect to the user of an owner of the terminal device is included in the auxiliary information.

(8) The information processing apparatus according to any one of (1) to (7), in which the recording unit further records an expiration date of the terminal identification information or a deadline for validation of the terminal identification information.

(9) An information processing method, including:
receiving individual identification information for identifying a user; creating terminal identification information for identifying a terminal device used at the time of accessing data associated with the individual identification information; recording the terminal identification information for one or each of a plurality of terminal devices in association with the individual identification information; and transmitting the terminal identification information.

(10) A program which causes a computer to execute a process, the process including: receiving individual identification information for identifying a user; creating terminal identification information for identifying a terminal device used at the time of accessing data associated with the individual identification information; recording the terminal identification information for one or each of a plurality of terminal devices in association with the individual identification information; and transmitting the terminal identification information.

(11) An information processing apparatus which accesses data associated with individual identification information for identifying a user, including: a near field communication unit which acquires the individual identification information, and terminal identification information for identifying the information processing apparatus from a target of near field communication by performing the near field communication; a recording unit which records the individual identification information and the terminal identification information;

a transmission unit which transmits the individual identification information, the terminal identification information, and an access request with respect to the data to a data provision device for recording the terminal identification information for one or each of a plurality of information processing apparatuses in association with the individual identification information; and a reception unit which receives the data transmitted according to the access request.

(12) The information processing apparatus according to (11), in which the transmission unit further transmits the individual identification information and the terminal identification information, and an invalidation request of access with respect to the data according to the information processing apparatus.

(13) An information processing method of an information processing apparatus which accesses data associated with individual identification information for identifying a user, including:

acquiring the individual identification information, and terminal identification information for identifying the information processing apparatus from a target of near field communication by performing the near field communication;

recording the individual identification information and the terminal identification information; transmitting the individual identification information, the terminal identification information, and an access request with respect to the data to a data provision device for recording the terminal identification information for one or each of a plurality of information processing apparatuses in association with the individual identification information; and receiving the data transmitted according to the access request.

(14) A program which causes a computer for controlling an information processing apparatus which accesses data associated with individual identification information for identifying a user to execute a process, the process including: acquiring the individual identification information, and terminal identification information for identifying the information processing apparatus from a target of near field communication by performing the near field communication;

recording the individual identification information and the terminal identification information; transmitting the individual identification information, the terminal identification information, and an access request with respect to the data to a data provision device for recording the terminal identification information for one or each of a plurality of information processing apparatuses in association with the individual identification information; and receiving the data transmitted according to the access request.

(15) An information processing apparatus, including: an acquirement unit which acquires individual identification information for identifying a user; a transmission unit which transmits the acquired individual identification information to a data provision device which manages data associated with the individual identification information, creates terminal identification information for identifying a terminal device used at the time of accessing the data, and records the terminal identification information for one or each of a plurality of terminal devices in association with the individual identification information; and a reception unit which receives the terminal identification information transmitted from the data provision device according to transmission of the individual identification information.

(16) The information processing apparatus according to (15), in which the transmission unit further transmits the individual identification information and the terminal identification information, and an invalidation request of access with respect to the data associated with the individual identification information according to the terminal device to be identified by the terminal identification information.

(17) The information processing apparatus according to (16), in which the data provision device records auxiliary information related to a registration of the terminal device to be identified by the terminal identification information in association with the individual identification information and the terminal identification information, the reception unit receives a list of the terminal identification information and the auxiliary information which are associated with the individual identification information from the data provision device, and the transmission unit transmits the invalidation request of the access of the terminal device to be specified by the terminal identification information and the auxiliary information which are selected from the list.

(18) The information processing apparatus according to (17), in which the auxiliary information is at least any one of a character string which is input by the terminal device, a year of birth of an owner of the terminal device, a gender of the owner, and a relationship with respect to the user of the owner.

(19) An information processing method, including:

acquiring individual identification information for identifying a user; transmitting the acquired individual identification information to a data provision device which manages data associated with the individual identification information, creates terminal identification information for identifying a terminal device used at the time of accessing the data, and records the terminal identification information for one or each of a plurality of terminal devices in association with the individual identification information; and receiving the terminal identification information transmitted from the data provision device according to transmission of the individual identification information.

(20) A program which causes a computer to execute a process, the process including: acquiring individual identification information for identifying a user; transmitting the acquired individual identification information to a data provision device which manages data associated with the individual identification information, creates terminal identification information for identifying a terminal device used at the time of accessing the data, and records the terminal identification information for one or each of a plurality of terminal devices in association with the individual identification information; and receiving the terminal identification information transmitted from the data provision device according to transmission of the individual identification information.

(21) An information processing system comprising: circuitry configured to receive a request for individual terminal identification information, the request including individual identification information, generate the individual terminal identification information, the individual terminal identification information identifies a terminal device with respect to other terminal devices and is used when accessing data associated with the individual identification information, and record in a storage device the individual terminal identification information in association with the individual identification information.

(22) The information processing system of (21), wherein the individual identification information does not include individual information regarding an individual.

(23) The information processing system of (21), wherein the circuitry is further configured to reply to a request message for data associated with the individual identification information and the terminal identification information, wherein the message includes the individual identification information and the terminal identification information.

(24) The information processing system of (21), wherein the circuitry is further configured to delete data associated with the individual identification information and the terminal identification information in response to receiving a deletion request along with the individual identification information and the terminal identification information.

(25) The information processing system of (21), wherein the circuitry is configured to receive auxiliary information along with the individual identification information and the terminal identification information and in response records the auxiliary information in association with the individual identification information and the terminal identification information.

(26) The information processing system of (21), wherein the circuitry is further configured to transmit a list of terminal identification information and auxiliary information for at least one terminal device, and suspend access to at least one terminal device identified from the list in a deletion request, and delete the individual identification information and the terminal identification information for the at least one terminal device identified in the list.

(27) The information processing system of (25), wherein the auxiliary information includes a birth year, a gender, and/or a relationship with respect to an operator of the terminal device owned by an owner.

(28) The information processing system of (25) wherein the circuitry is configured to record an expiration date of the terminal identification information and/or a validity deadline for the terminal identification information.

(29) An information processing system comprising: circuitry configured to acquire individual identification information and individual information associated with an individual, transmit a request to a remote device for an individual terminal identification information, the request including the individual identification information, the individual terminal identification information identifies a terminal device with respect to other terminal devices, and receive the individual terminal identification information.

(30) The information processing system of (29), wherein the individual identification information does not include individual information regarding an individual.

(31) The information processing system of (29), wherein the circuitry is further configured to acquire and transmit the individual identification information to the remote device, and in response receive the terminal identification information.

(32) The information processing system of (29), wherein the circuitry is further configured to generate a code that that includes individual terminal identification information, individual information, and individual identification information, and transmit the code to the terminal device that is identified by the terminal identification information.

(33) The information process system of (32), wherein the circuitry is further configured to display the code.

(34) A terminal device comprising: circuitry configured to receive from a remote store terminal a code that includes individual terminal identification information, individual information, and individual identification information, decode the code, and record the individual terminal identification information, individual information, and individual identification information, wherein the remote store terminal received the individual terminal identification information from a remote device by providing the remote device with the individual identification information.

(35) The terminal device of (34) wherein the circuitry does not provide the individual information to the remote device.

(36) The terminal device of (34), wherein the circuitry is configured to transmit the individual identification information, the terminal identification information and access request to the remote device and receives in return data associated with the access request.

(37) An information processing method comprising: receiving via an interface a request for individual terminal identification information, the request including individual identification information; generating with circuitry the individual terminal identification information, the individual terminal identification information identifies a terminal device with respect to other terminal devices and is used when accessing data associated with the individual identification information; and recording in a storage device the individual terminal identification information in association with the individual identification information.

(38) The method of (37), wherein the request does not include individual information regarding the individual.

(39) An information processing method comprising: acquiring individual identification information and individual information associated with an individual, transmitting with circuitry a request to a remote device for an individual terminal identification information, the request including the individual identification information, the individual terminal identification information identifies a terminal device with respect to other terminal devices, and receiving with the circuitry the individual terminal identification information.

(40) The method of (39), wherein the request does not include the individual information.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 11 member store terminal device
12 data center
13 IC card
14 portable terminal device
42 communication unit
51 registration management unit
52 creation unit
53 information management unit
81 information identification reader
82 communication unit
91 code creation unit
92 request processing unit
111 communication unit
112 near field communication unit
115 recording unit
121 decoding unit
122 information management unit
123 browsing control unit
124 display control unit

The invention claimed is:

1. An information processing system comprising:
circuitry configured to:
receive a request for individual terminal identification information, the request including individual identification information,
generate the individual terminal identification information, the individual terminal identification information identifies a terminal device with respect to other terminal devices and is used when accessing data associated with the individual identification information,
record in a storage device the individual terminal identification information in association with the individual identification information,
transmit a list of terminal identification information and auxiliary information for at least one terminal device, and
suspend access to at least one terminal device identified from the list in a deletion request, and delete the individual identification information and the terminal identification information for the at least one terminal device identified in the list.

2. The information processing system of claim 1, wherein the individual identification information does not include individual information regarding an individual.

3. The information processing system of claim 1, wherein the circuitry is further configured to
reply to a request message for data associated with the individual identification information and the terminal identification information, wherein the message includes the individual identification information and the terminal identification information.

4. The information processing system of claim 1, wherein the circuitry is further configured to delete data associated with the individual identification information and the terminal identification information in response to receiving the deletion request along with the individual identification information and the terminal identification information.

5. The information processing system of claim 1, wherein the circuitry is configured to receive auxiliary information along with the individual identification information and the terminal identification information and in response records the auxiliary information in association with the individual identification information and the terminal identification information.

6. The information processing system of claim 5, wherein the auxiliary information includes a birth year, a gender, and/or a relationship with respect to an operator of the terminal device owned by an owner.

7. The information processing system of claim 5, wherein the circuitry is configured to record an expiration date of the terminal identification information and/or a validity deadline for the terminal identification information.

8. An information processing system comprising:
circuitry configured to:
acquire individual identification information and individual information associated with an individual,
transmit a request to a remote device for an individual terminal identification information, the request including the individual identification information, the individual terminal identification information identifies a terminal device with respect to other terminal devices,
receive the individual terminal identification information,
receive a list of terminal identification information and auxiliary information for at least one terminal device, and
transmit a deletion request that identifies at least one terminal device identified in the list, wherein access to the at least one terminal device identified from the list in the deletion request is suspended, and the individual identification information and the terminal identification information for the at least one terminal device identified in the delete request deleted.

9. The information processing system of claim 8, wherein the individual identification information does not include individual information regarding an individual.

10. The information processing system of claim 8, wherein the circuitry is further configured to
acquire and transmit the individual identification information to the remote device, and in response receive the terminal identification information.

11. The information processing system of claim 8, wherein the circuitry is further configured to
generate a code that that includes individual terminal identification information, individual information, and individual identification information, and transmit the code to the terminal device that is identified by the terminal identification information.

12. The information process system of claim 11, wherein the circuitry is further configured to display the code.

13. An information processing method comprising:
receiving via an interface a request for individual terminal identification information, the request including individual identification information;
generating with circuitry the individual terminal identification information, the individual terminal identification information identifies a terminal device with respect to other terminal devices and is used when accessing data associated with the individual identification information;

recording in a storage device the individual terminal identification information in association with the individual identification information;

transmitting with the circuitry a list of terminal identification information and auxiliary information for at least one terminal device, and suspending with the circuitry access to at least one terminal device identified from the list in a deletion request, and delete the individual identification information and the terminal identification information for the at least one terminal device identified in the list.

14. The method of claim 13, wherein the request for the individual terminal identification information does not include individual information regarding the individual.

15. An information processing method comprising:

acquiring individual identification information and individual information associated with an individual, transmitting with circuitry a request to a remote device for an individual terminal identification information, the request including the individual identification information, the individual terminal identification information identifies a terminal device with respect to other terminal devices, receiving with the circuitry the individual terminal identification information;

receiving with the circuitry a list of terminal identification information and auxiliary information for at least one terminal device, and transmitting a deletion request that identifies at least one terminal device identified in the list, wherein access to the at least one terminal device identified from the list in the deletion request is suspended, and the individual identification information and the terminal identification information for the at least one terminal device identified in the delete request.

16. The method of claim 15, wherein the request for the individual terminal identification information does not include the individual information.

* * * * *